United States Patent
Raj et al.

(10) Patent No.: US 9,842,015 B2
(45) Date of Patent: Dec. 12, 2017

(54) INSTRUCTION AND LOGIC FOR MACHINE CHECKING COMMUNICATION

(71) Applicant: INTEL CORPORATION, Santa Clara, CA (US)

(72) Inventors: Ashok Raj, Portland, OR (US); Mohan J. Kumar, Aloha, OR (US); Jose A. Vargas, Rescue, CA (US); William G. Auld, Portland, OR (US); Cameron B. McNairy, Windsor, CO (US); Theodros Yigzaw, Sherwood, OR (US); James B. Crossland, Banks, OR (US); Anthony E. Luck, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 671 days.

(21) Appl. No.: 14/040,092

(22) Filed: Sep. 27, 2013

(65) Prior Publication Data
US 2015/0095705 A1   Apr. 2, 2015

(51) Int. Cl.
*G06F 11/00* (2006.01)
*G06F 11/07* (2006.01)

(52) U.S. Cl.
CPC ...... *G06F 11/0772* (2013.01); *G06F 11/0712* (2013.01); *G06F 11/0724* (2013.01); *G06F 11/0784* (2013.01); *G06F 11/0793* (2013.01)

(58) Field of Classification Search
CPC ............. G06F 11/0772; G06F 11/0712; G06F 11/0724; G06F 11/0784; G06F 11/0793
See application file for complete search history.

(56) References Cited

U.S. PATENT DOCUMENTS

| | | | | |
|---|---|---|---|---|
| 7,287,197 B2* | 10/2007 | Bennett | ............... | G06F 9/45533 714/38.13 |
| 8,938,737 B2* | 1/2015 | Neiger | ............... | G06F 9/45533 710/260 |
| 2002/0112203 A1 | 8/2002 | Andress et al. | | |
| 2004/0215937 A1* | 10/2004 | Burky | .................... | G06F 9/3836 712/218 |
| 2006/0107125 A1* | 5/2006 | Hsu | ..................... | G06F 11/0745 714/100 |
| 2006/0149995 A1* | 7/2006 | Kondajeri | ........... | G06F 11/0712 714/5.11 |

(Continued)

FOREIGN PATENT DOCUMENTS

| | | |
|---|---|---|
| WO | 03/021438 A1 | 3/2003 |
| WO | 2013/101111 A1 | 8/2013 |

OTHER PUBLICATIONS

Search Report, European Patent Application 14186704.4; 9 pages, Jul. 16, 2015.

(Continued)

*Primary Examiner* — Jason Bryan
(74) *Attorney, Agent, or Firm* — Patent Capital Group

(57) ABSTRACT

A processor includes a logic to determine an error condition reported in an error bank. The error bank is communicatively coupled to the processor and is associated with logical processors of the processor. The processor includes another logic to generate an interrupt indicating the error condition. The processor includes yet another logic to selectively send the interrupt to a single one of the logical processors associated with the error bank.

15 Claims, 34 Drawing Sheets

(56) References Cited

U.S. PATENT DOCUMENTS

2008/0005615 A1* 1/2008 Brenden ............ G06F 11/0793
 714/13
2011/0107148 A1* 5/2011 Franklin ............ G06F 11/0712
 714/37
2013/0339829 A1* 12/2013 Vargas ................ G06F 11/1004
 714/807

OTHER PUBLICATIONS

Andi Kleen, "Machine Check Handling on Linux," *SUSE Labs*, 7 pages, Aug. 2004.

* cited by examiner

FIG. 3B

```
 127    120 119   112 111   104 103                    24 23    16 15     8 7      0
| bbbb bbbb | bbbb bbbb | bbbb bbbb |    • • •      | bbbb bbbb | bbbb bbbb | bbbb bbbb |
```
UNSIGNED PACKED BYTE REPRESENTATION 344

```
 127    120 119   112 111   104 103                    24 23    16 15     8 7      0
| sbbb bbbb | sbbb bbbb | sbbb bbbb |    • • •      | sbbb bbbb | sbbb bbbb | sbbb bbbb |
```
SIGNED PACKED BYTE REPRESENTATION 345

```
 127                    112 111                                   16 15              0
| wwww wwww wwww wwww |              • • •                  | wwww wwww wwww wwww |
```
UNSIGNED PACKED WORD REPRESENTATION 346

```
 127                    112 111                                   16 15              0
| swww wwww wwww wwww |              • • •                  | swww wwww wwww wwww |
```
SIGNED PACKED WORD REPRESENTATION 347

```
 127                               92 91    32 31                                    0
| dddd dddd dddd dddd dddd dddd dddd dddd | • • • | dddd dddd dddd dddd dddd dddd dddd dddd |
```
UNSIGNED PACKED DOUBLEWORD REPRESENTATION 348

```
 127                               92 91    32 31                                    0
| sddd dddd dddd dddd dddd dddd dddd dddd | • • • | sddd dddd dddd dddd dddd dddd dddd dddd |
```
SIGNED PACKED DOUBLEWORD REPRESENTATION 349

*FIG. 3C*

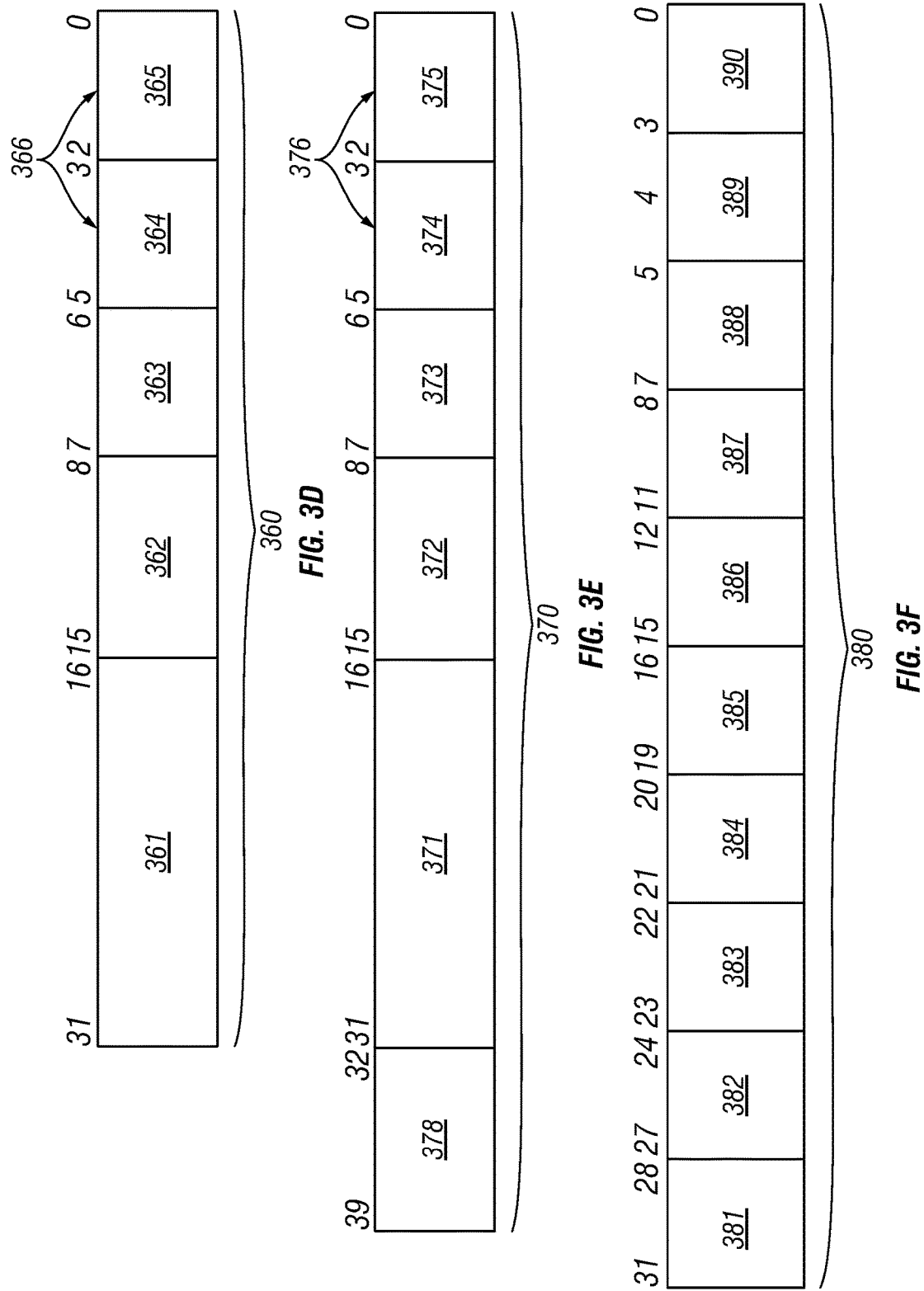

INSTRUCTION AND LOGIC FOR MACHINE CHECKING COMMUNICATION

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. Many areas of computing, such as servers, etc., call for a very high uptime with little or no downtime. In order to achieve this high uptime, systems designers have built reliability into these platforms at many levels. An example of this reliability is the use of error correction codes. However, some errors may not be corrected. A machine check interrupt or exception may be used to notify software executing on a processor that that an error has occurred. The error may be handled by the software.

DESCRIPTION OF THE FIGURES

Embodiments are illustrated by way of example and not limitation in the Figures of the accompanying drawings:

FIG. 3B illustrates possible in-register data storage formats, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

DETAILED DESCRIPTION

Figure 1A:
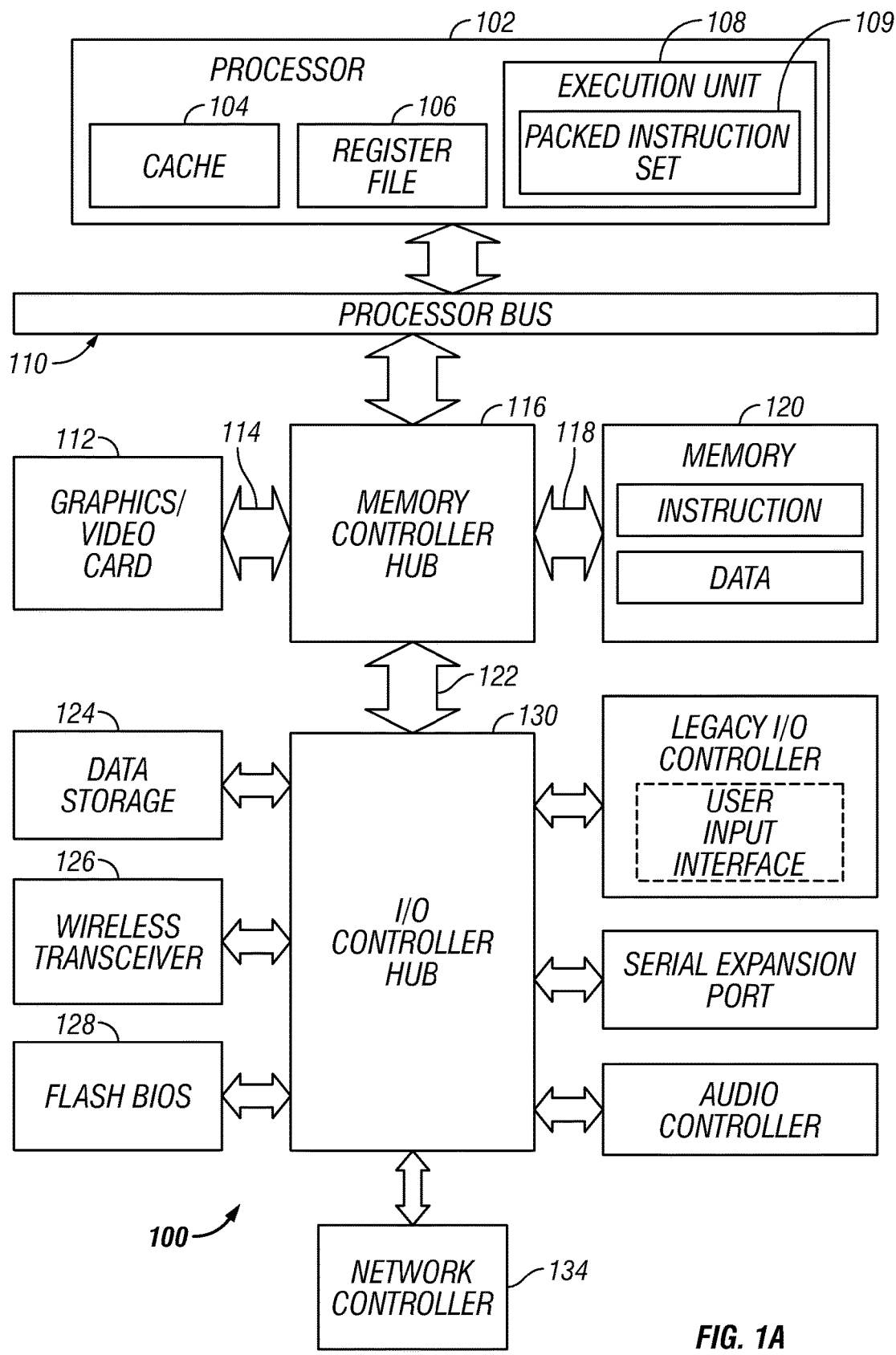
FIG. 1A is a block diagram of an exemplary computer system formed with a processor that may include execution units to execute an instruction, in accordance with embodiments of the present disclosure.

The following description describes an instruction and processing logic for machine check communication within or in association with a processor, virtual processor, package, computer system, or other processing apparatus. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from higher pipeline throughput and improved performance. The teachings of embodiments of the present disclosure are applicable to any processor or machine that performs data manipulations. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components.

Instructions used to program logic to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including logic to perform integer and floating point operations, also resides in processor 102. Processor 102 may also include a microcode (ucode) ROM that stores microcode for certain macroinstructions. In one embodiment, execution unit 108 may include logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
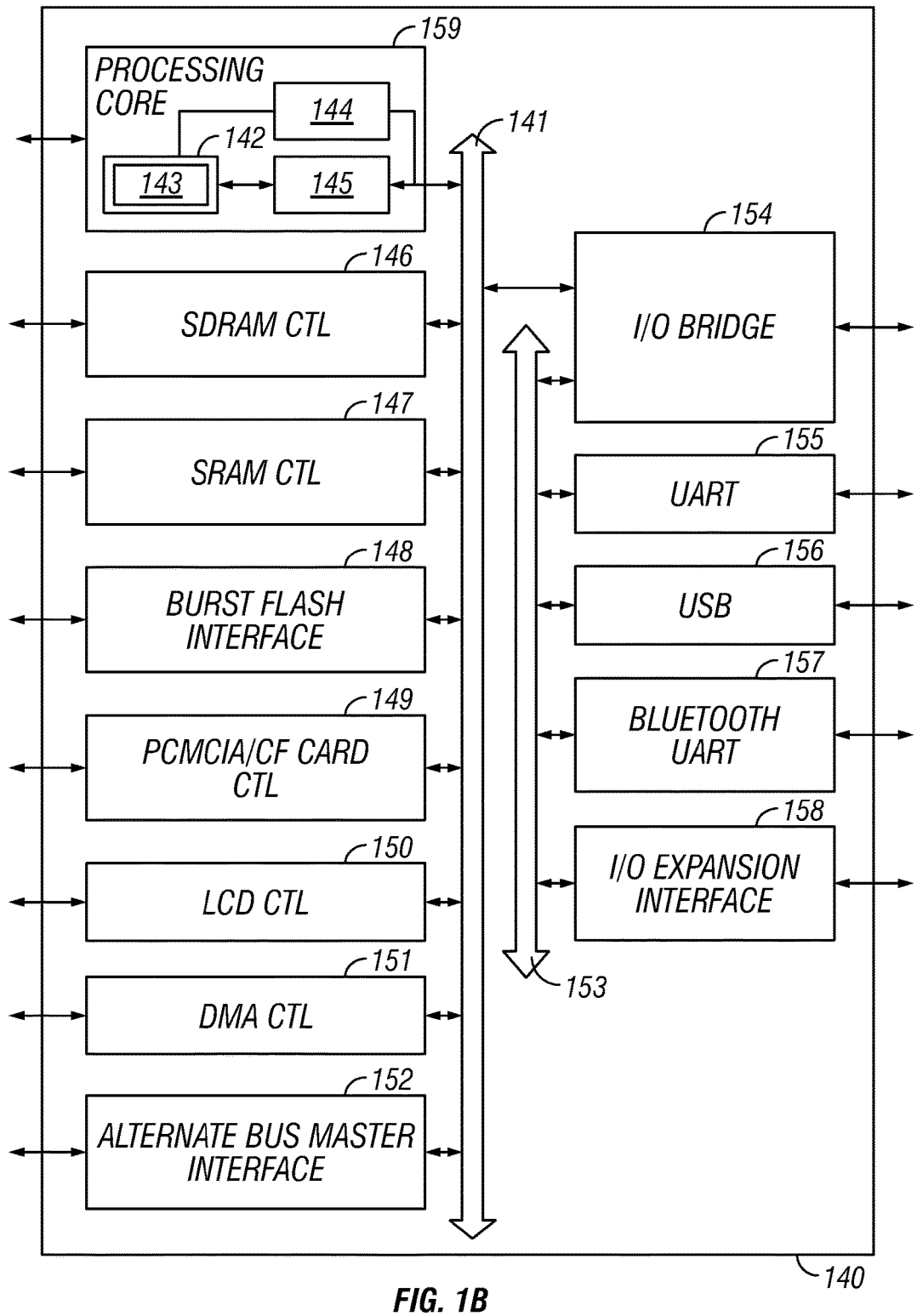
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
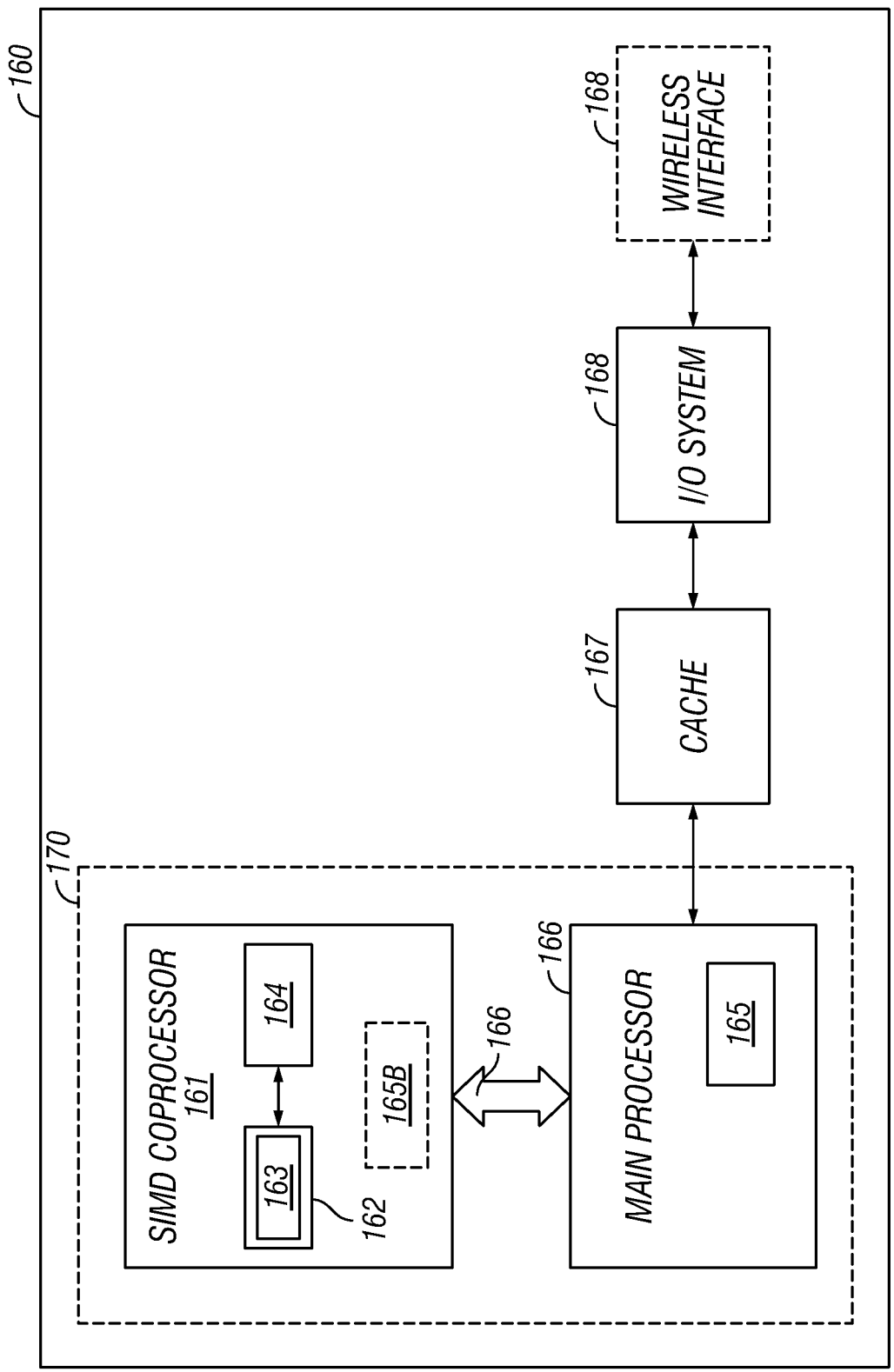
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 165 comprises a decoder 165 to recognize instructions of instruction set 163 including instructions in accordance with one embodiment for execution by execution unit 162. In other embodiments, SIMD coprocessor 161 also comprises at least part of decoder 165 to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165 of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 166. From coprocessor bus 166, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
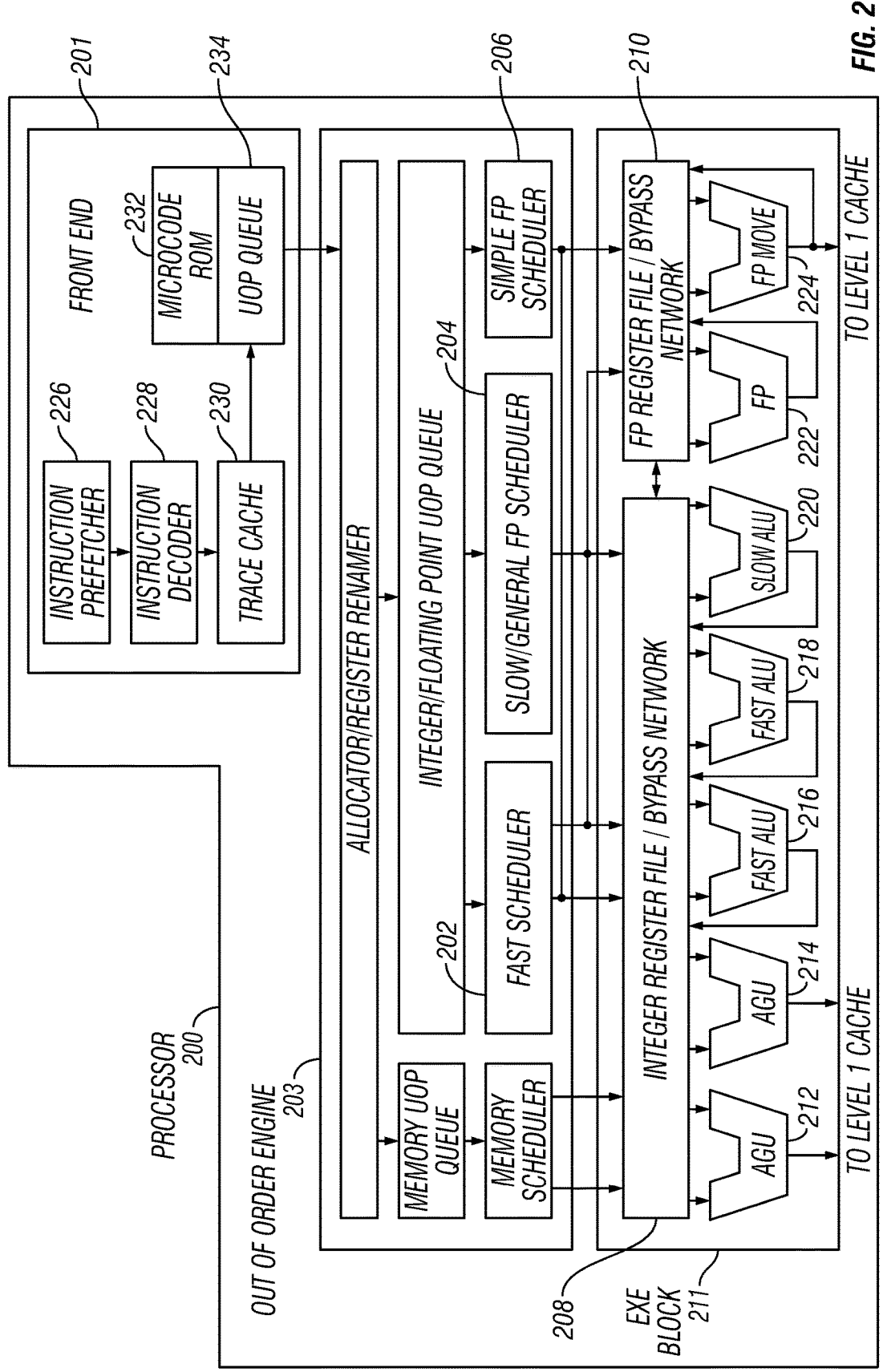
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

Figure 3A:
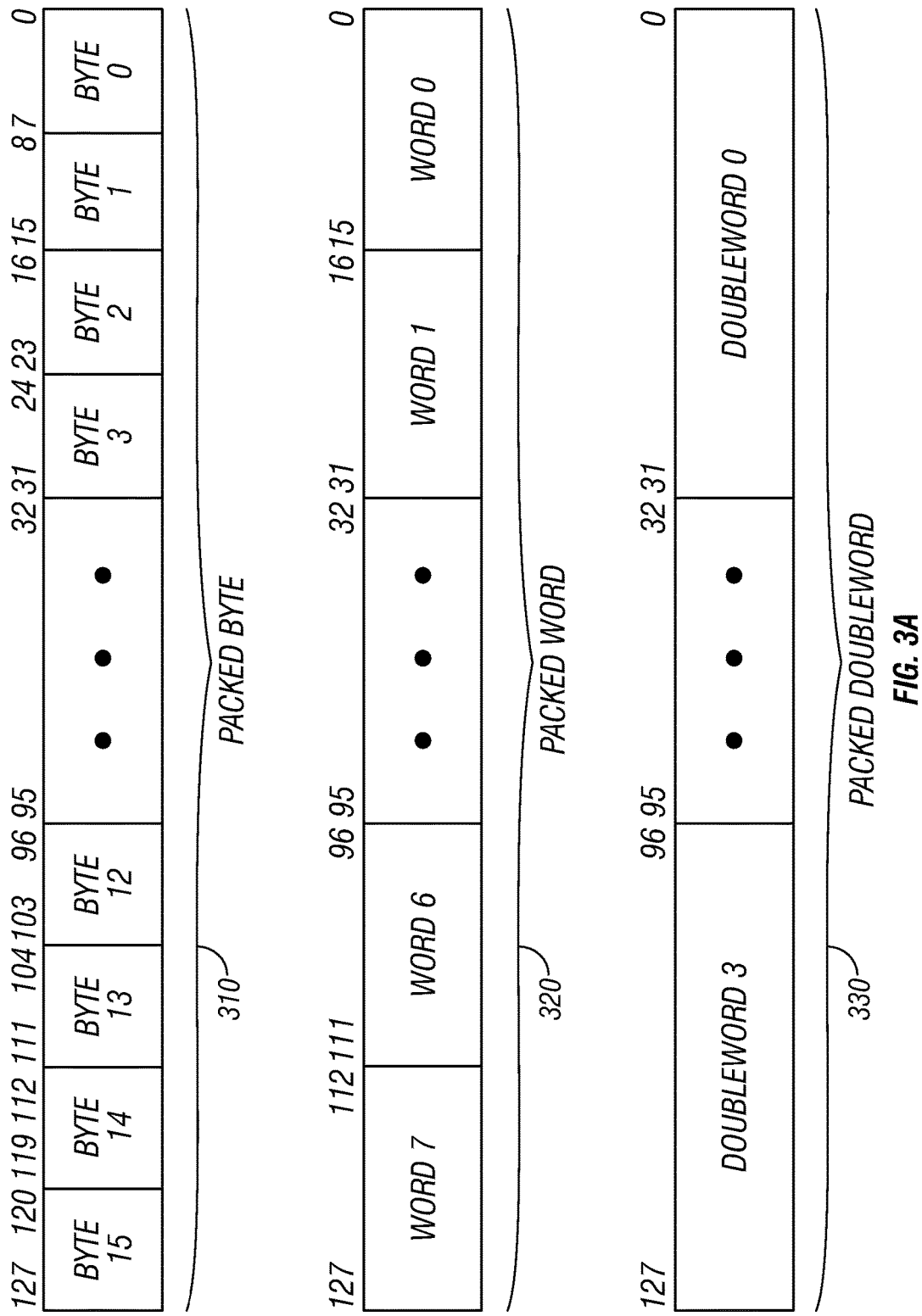
FIG. 3A illustrates various packed data type representations in multimedia registers, in accordance with embodiments of the present disclosure.

In the examples of the following figures, a number of data operands may be described. FIG. 3A illustrates various packed data type representations in multimedia registers, in accordance with embodiments of the present disclosure.

FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, and instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 an 0064 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
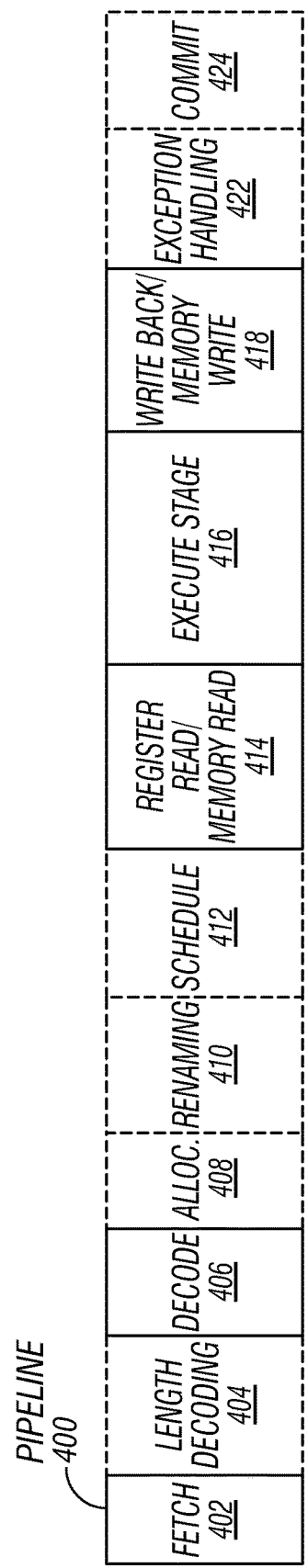
FIG. 4A is a block diagram illustrating an in-order pipeline and a register renaming stage, out-of-order issue/execution pipeline, in accordance with embodiments of the present disclosure.
Figure 4B:
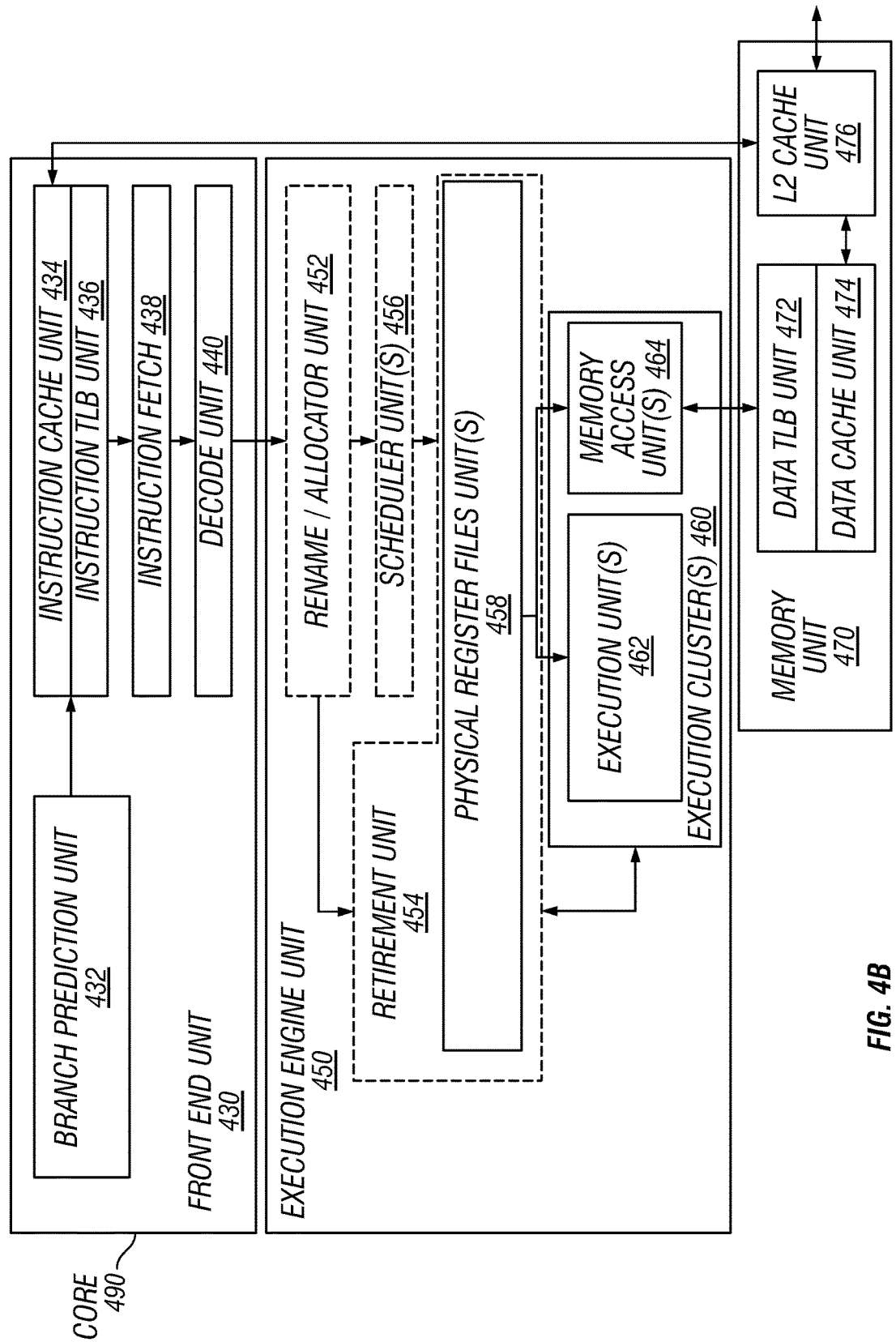
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and a register renaming logic, out-of-order issue/execution logic to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a writeback/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 154 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 162 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyper-threading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the cache may be external to the core and/or the processor.

Figure 5A:
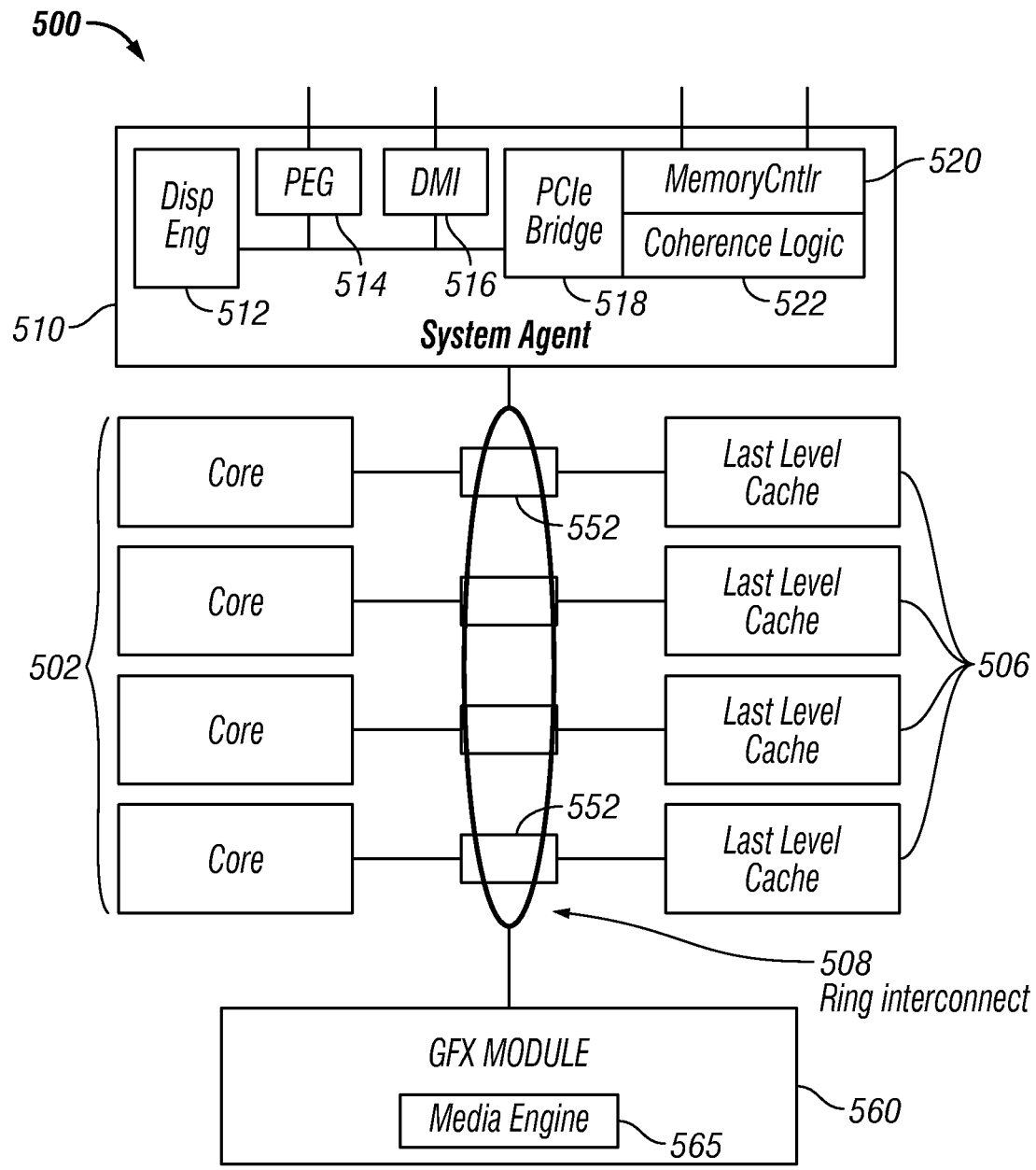
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface 1214 for communications busses for graphics. In one embodiment, interface 1214 may be implemented by PCI Express (PCIe). In a further embodiment, interface 1214 may be implemented by PCI Express Graphics (PEG). System agent 510 may include a direct media interface (DMI) 516. DMI 516 may provide links between different bridges on a motherboard or other portion of a computer system. System agent 510 may include a PCIe bridge 1218 for providing PCIe links to other elements of a computing system. PCIe bridge 1218 may be implemented using a memory controller 1220 and coherence logic 1222.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
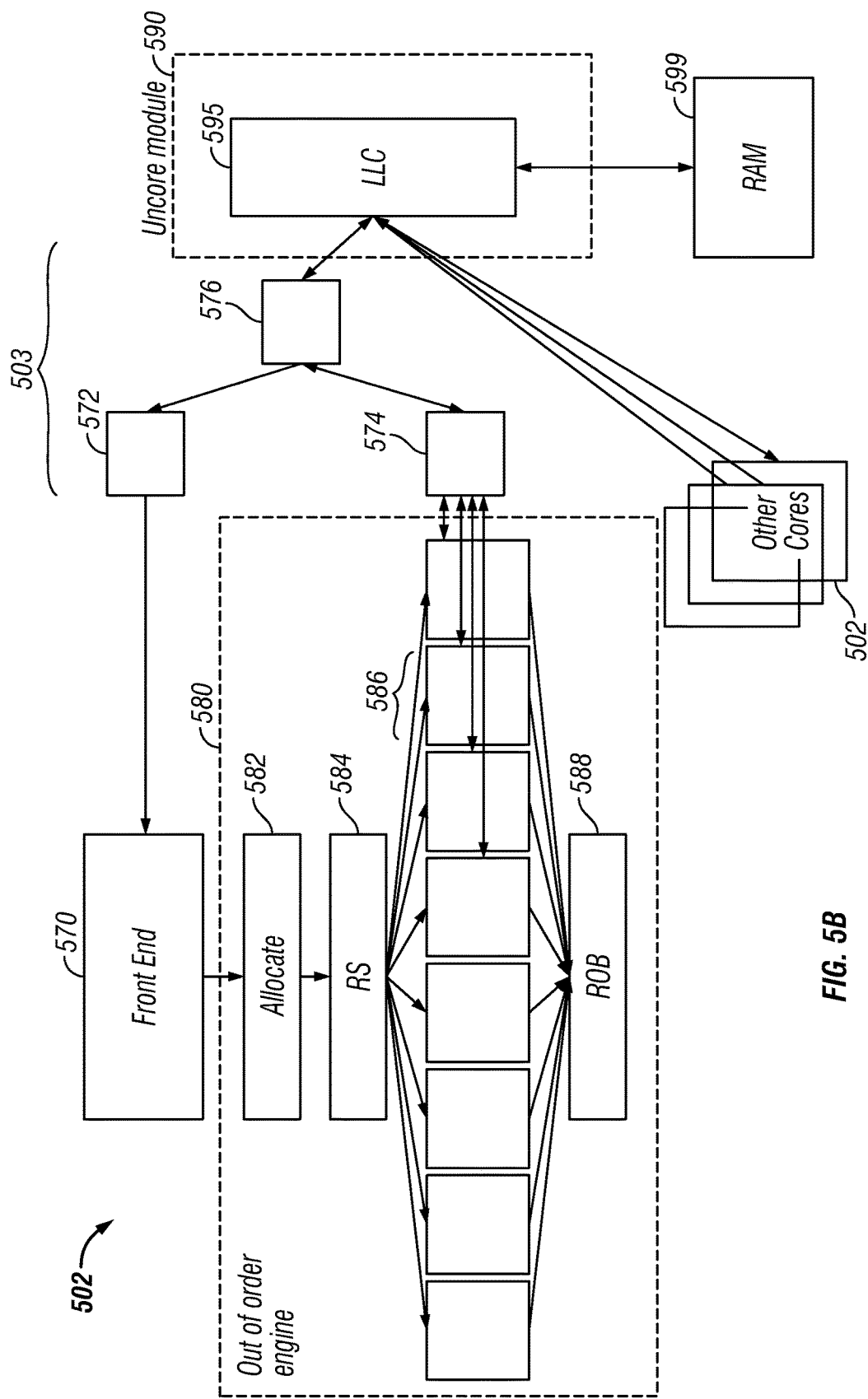
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 1282. In one embodiment, allocate module 1282 may allocate resources of processor 500 or other resources, such as registers or buffers, to execute a given instruction. Allocate module 1282 may make allocations in schedulers, such as a memory scheduler, fast scheduler, or floating point scheduler. Such schedulers may be represented in FIG. 5B by resource schedulers 584. Allocate module 12182 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
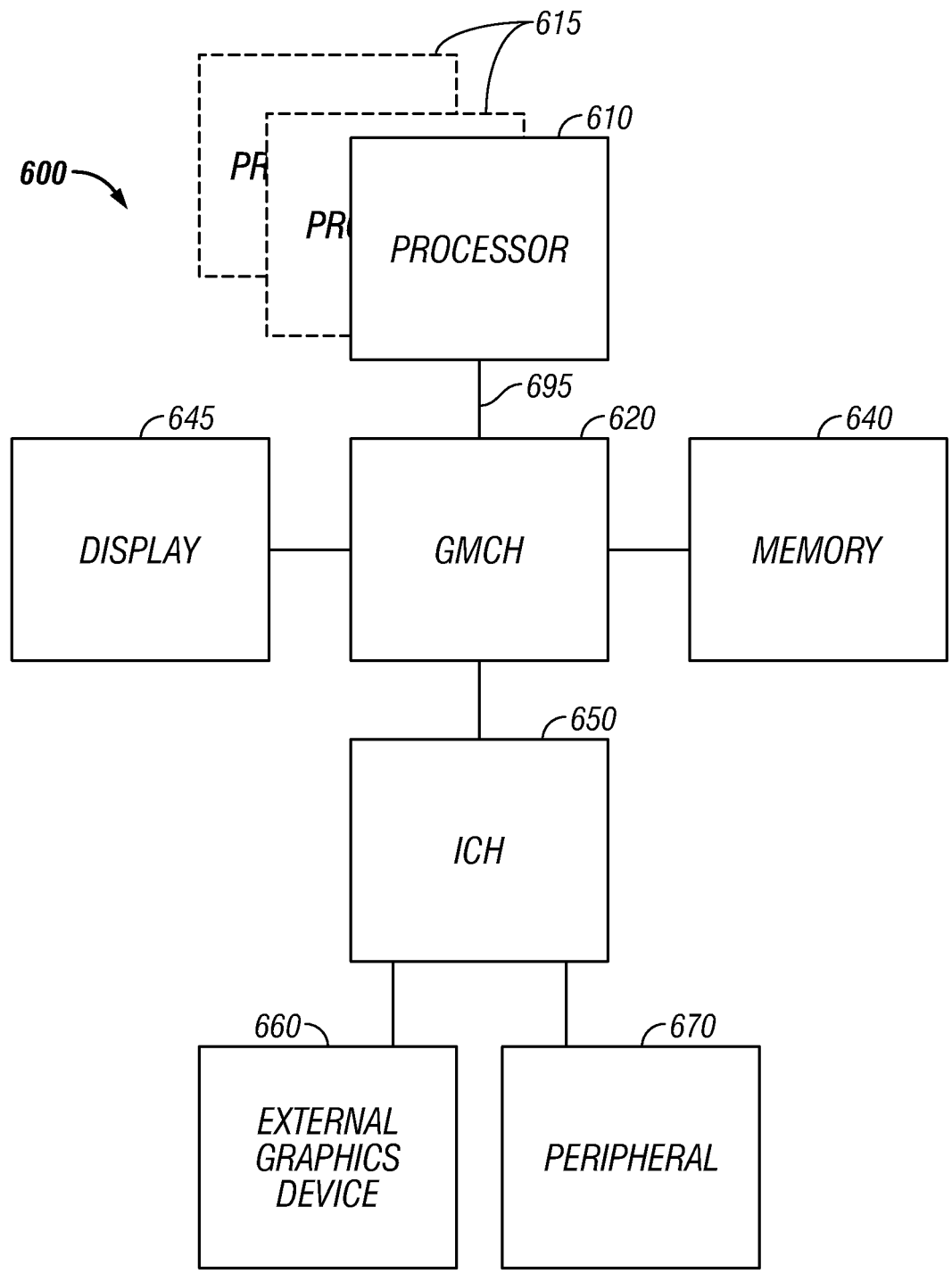
FIG. 6 is a block diagram of a system, in accordance with embodiments of the present disclosure.
Figure 7:
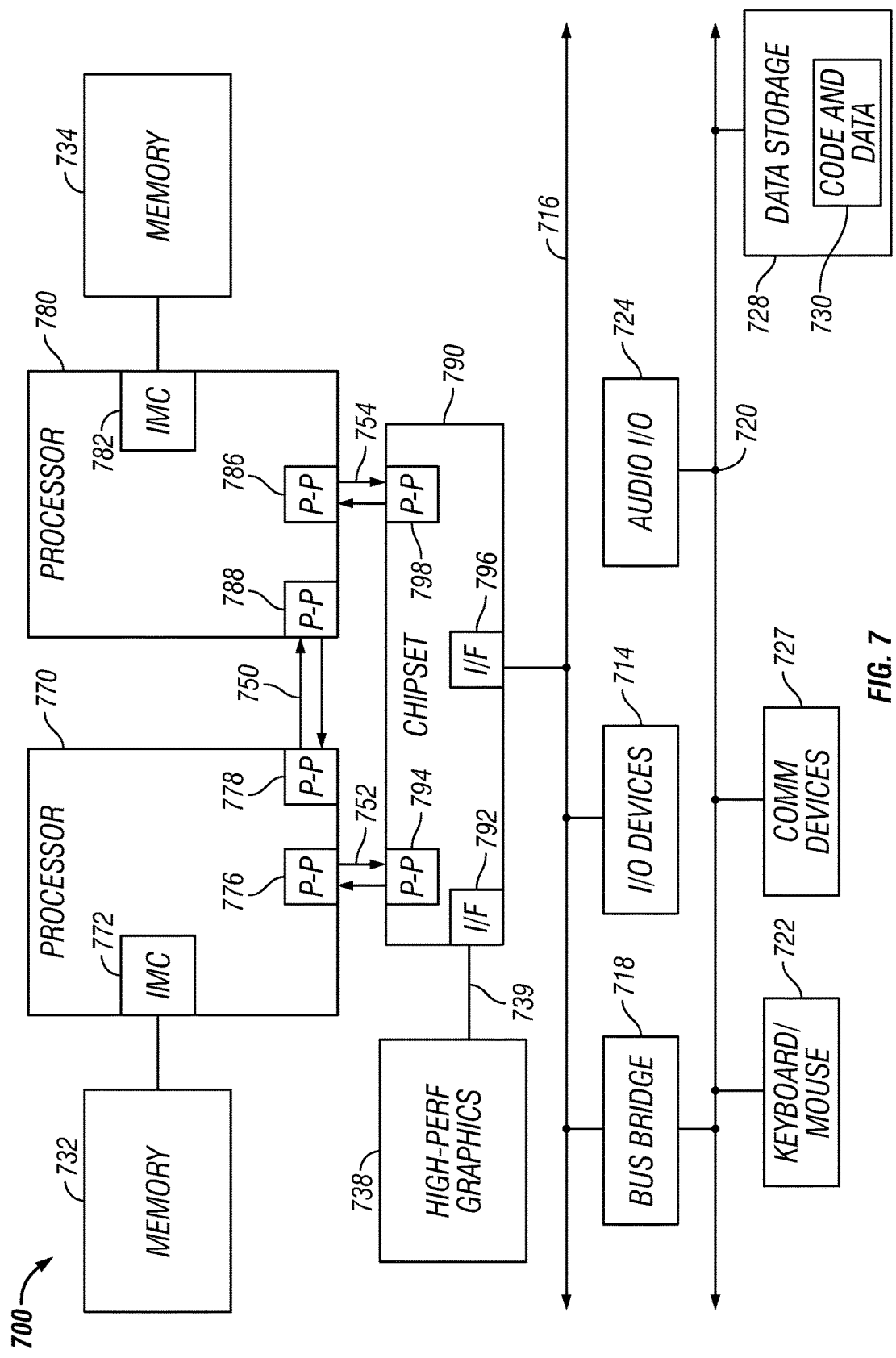
FIG. 7 is a block diagram of a second system, in accordance with embodiments of the present disclosure.
Figure 8:
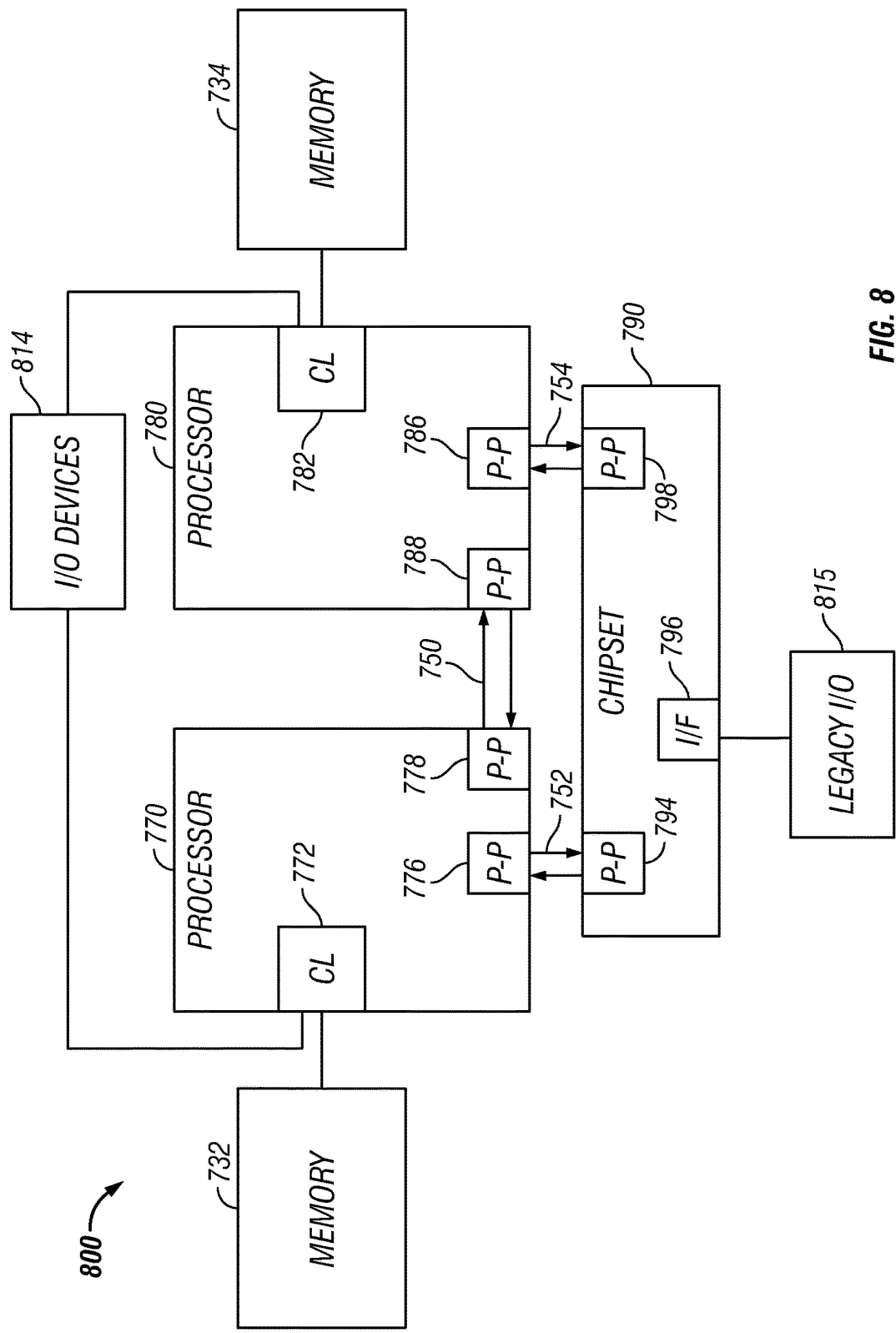
FIG. 8 is a block diagram of a third system in accordance with embodiments of the present disclosure.
Figure 9:
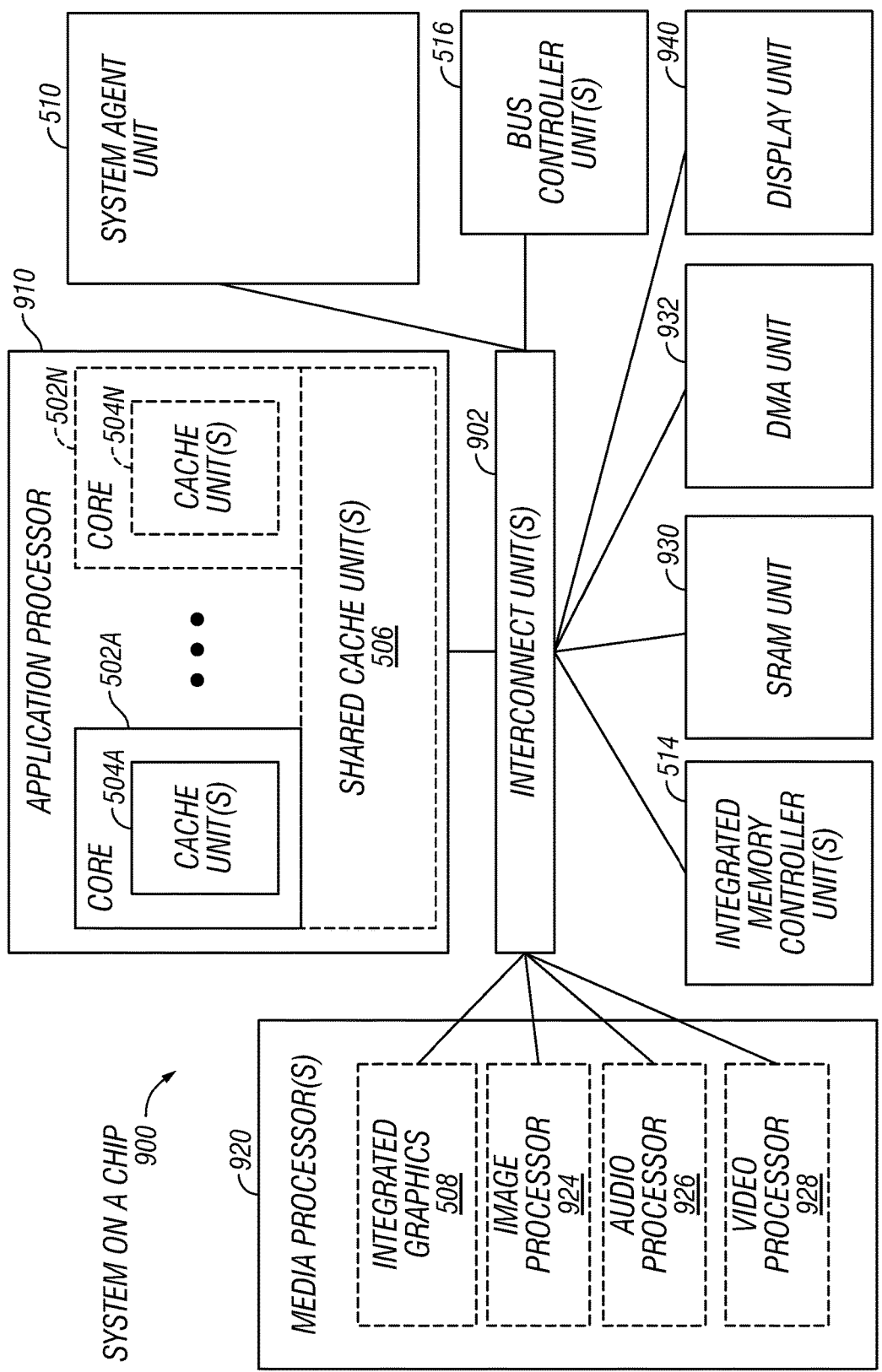
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include be a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610, 615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 870, 880 may include integrated memory and I/O control logic ("CL") 872 and 882, respectively. For at least one embodiment, CL 872, 882 may include integrated memory controller units such as that described above in connection with FIGS. 5 and 7. In addition, CL 872, 882 may also include I/O control logic. FIG. 8 illustrates that not only memories 832, 834 may be coupled to CL 872, 882, but also that I/O devices 814 may also be coupled to control logic 872, 882. Legacy I/O devices 815 may be coupled to chipset 890.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 902A-N and shared cache units 906; a system agent unit 910; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
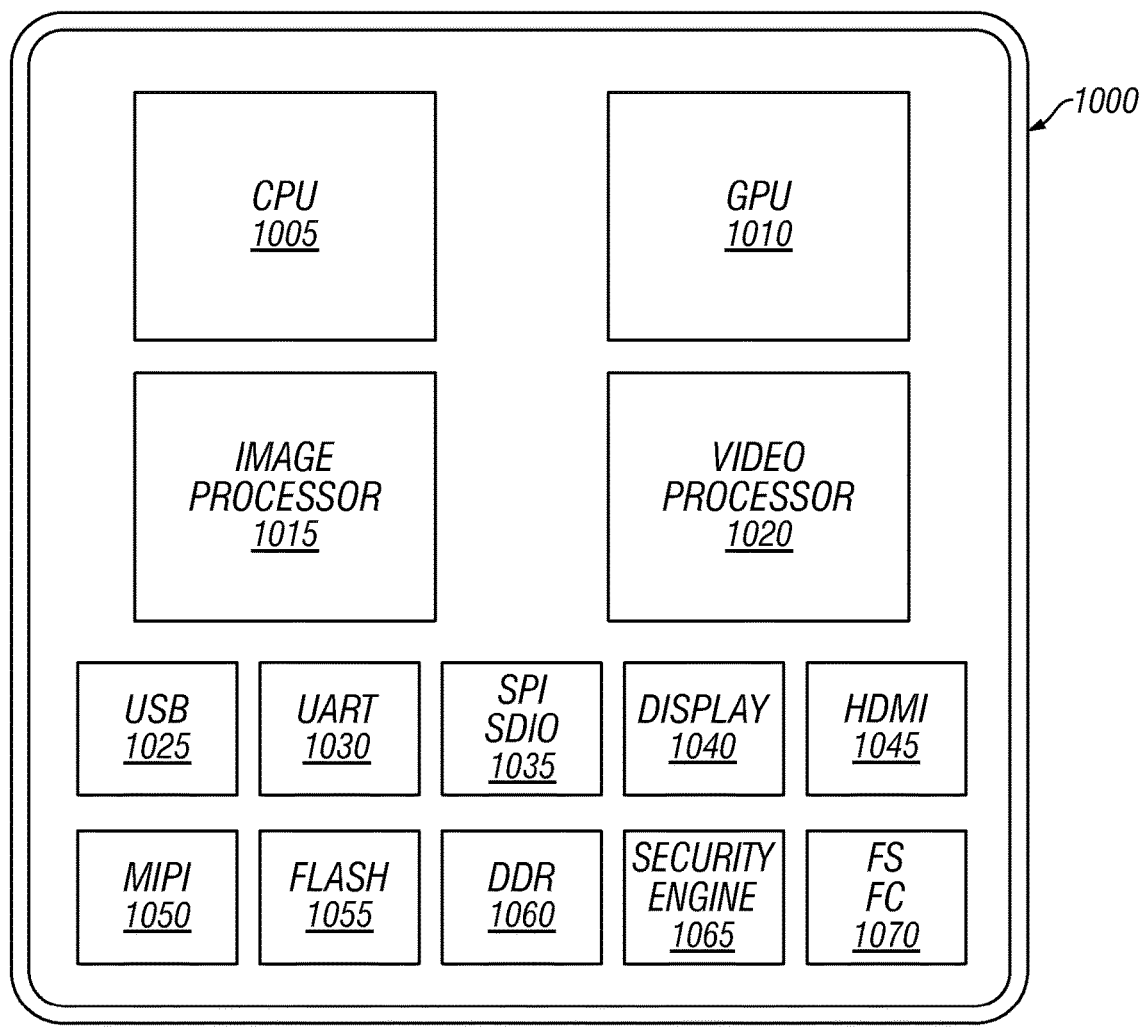
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and $I^2S/I^2C$ controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
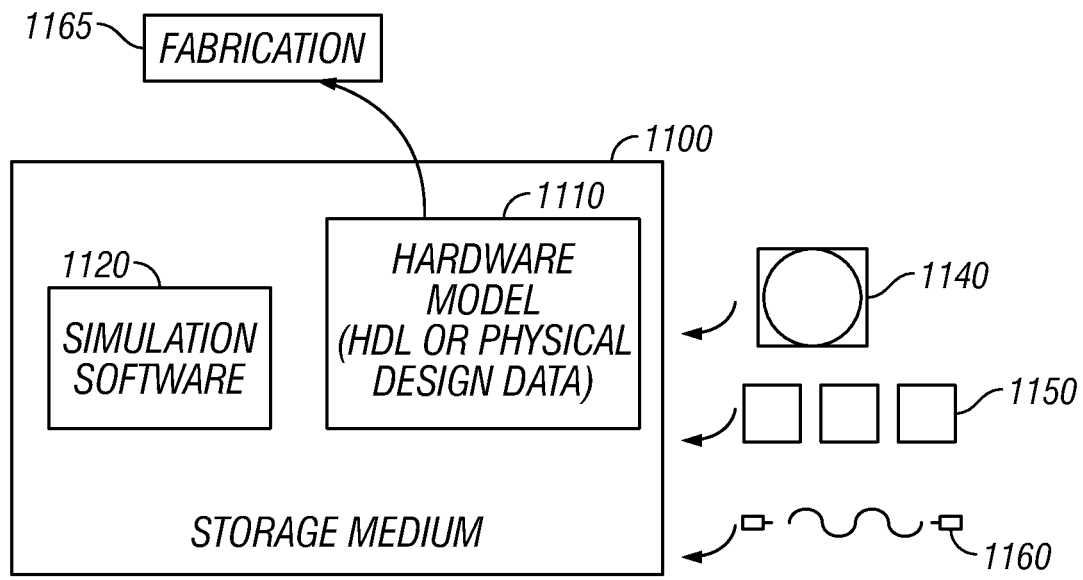
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1130 may include simulation software 1120 and/or hardware or software model 1110. In one embodiment, the data representing the IP core design may be provided to storage 1130 via memory 1140 (e.g., hard disk), wired connection (e.g., internet) 1150 or wireless connection 1160. The IP core information generated by the simulation tool and model may then be transmitted to a fabrication facility where it may be fabricated by a $3^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
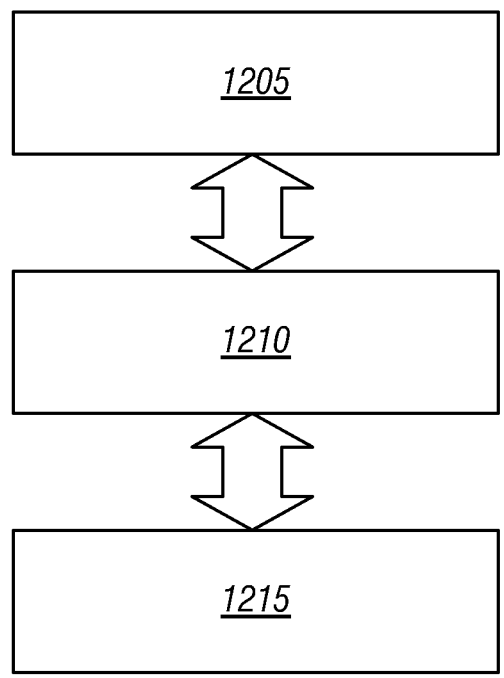
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
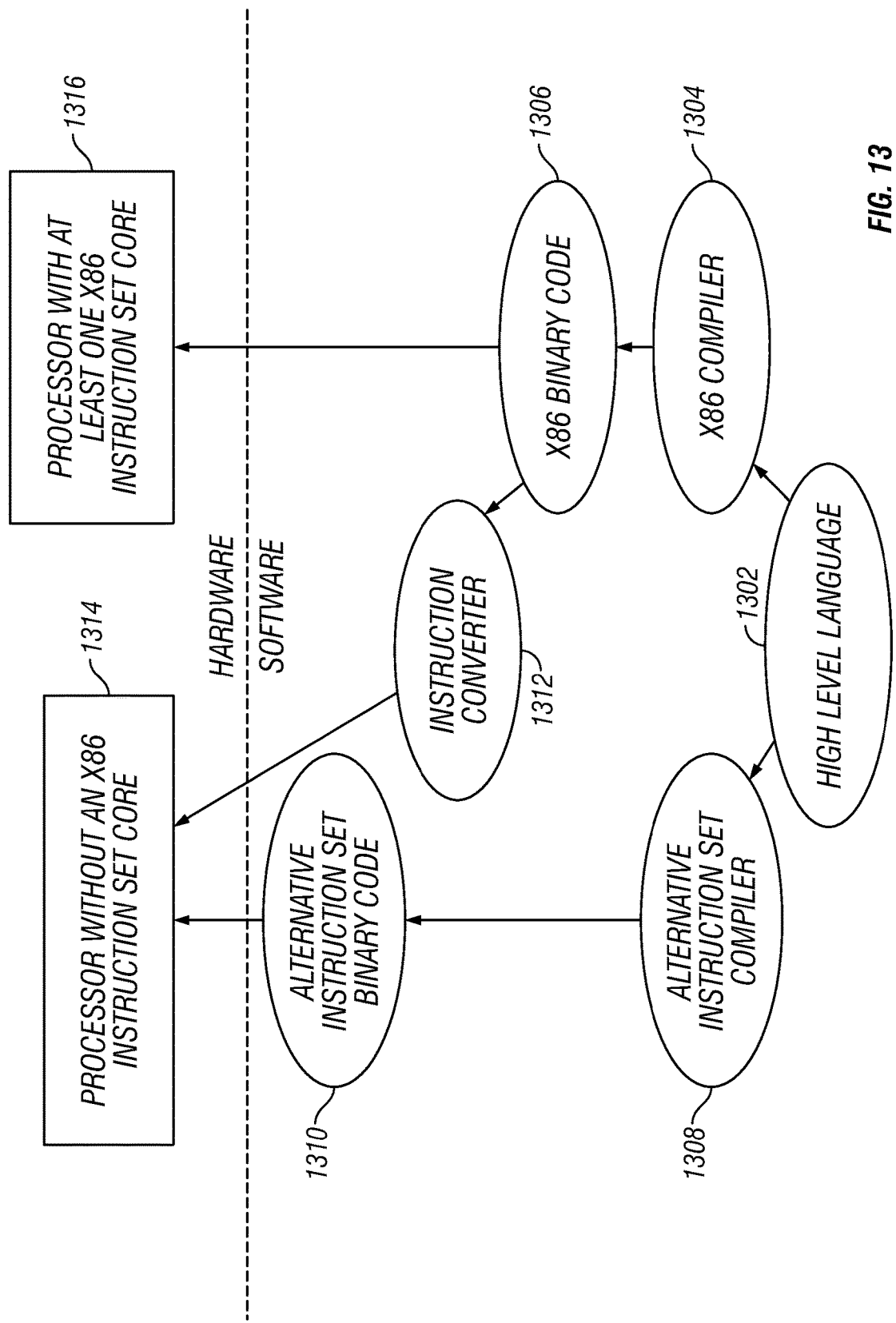
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as a Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306.

Figure 14:
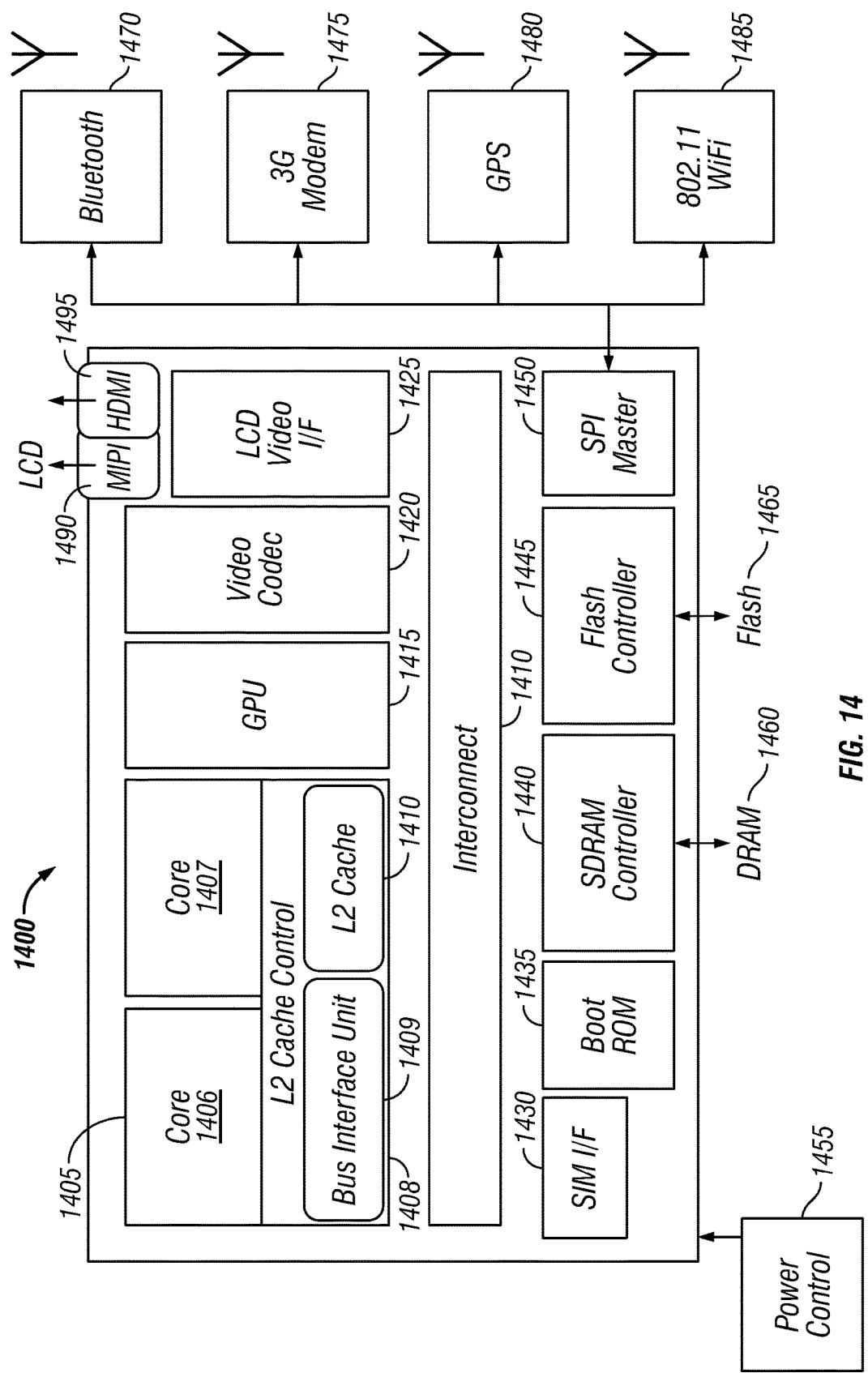
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1410. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module. Flash controller 1445 may provide access to or from memory such as flash memory or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11.

Figure 15:
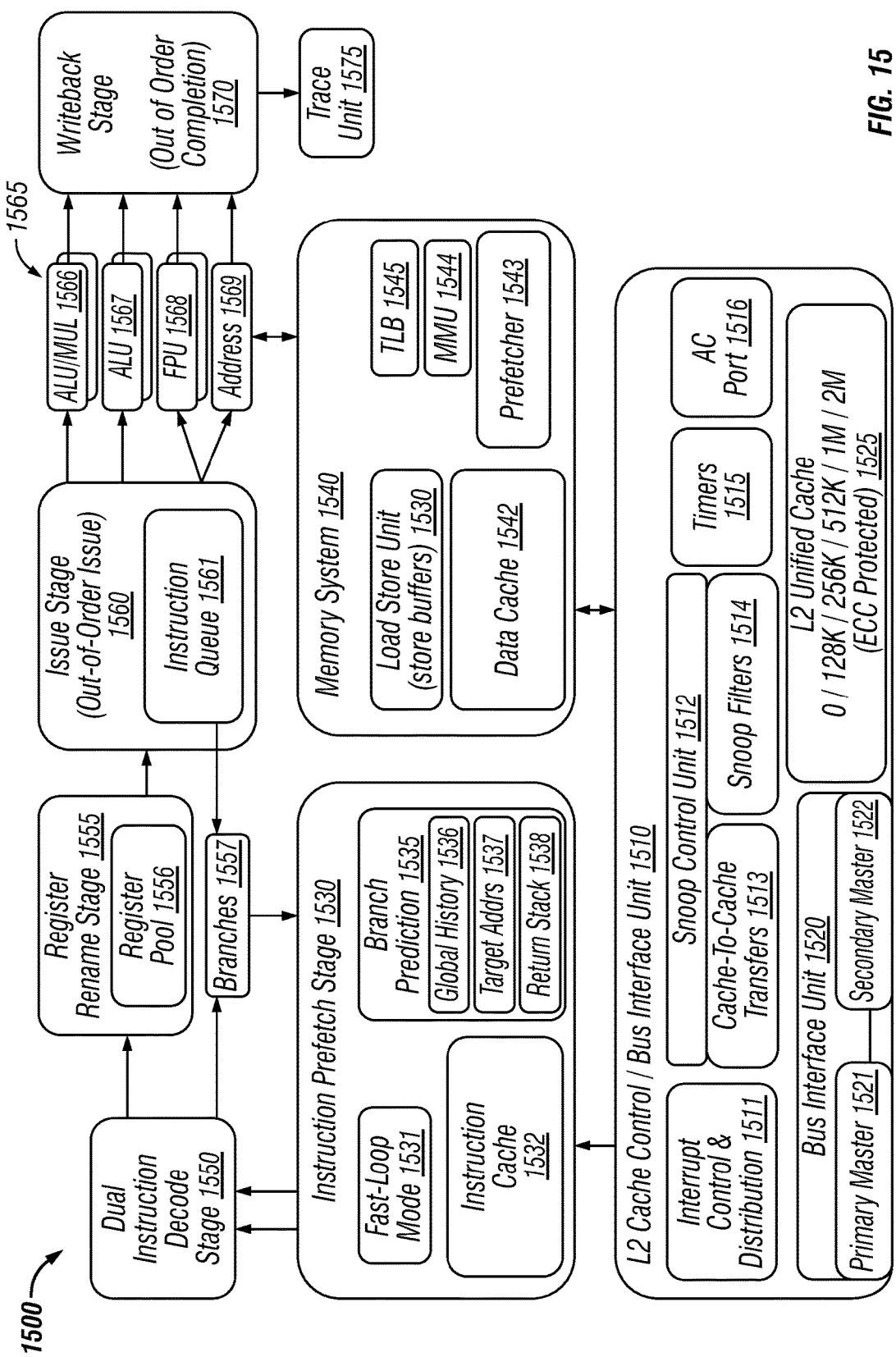
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1564 may be performed by one or more stages of execution. Such stages may include, for example, instruction prefetch stage 1530, dual instruction decode stage 1550, register rename stage 155, issue stage 1560, and writeback stage 1570.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128 k, 256 k, 512 k, 1M, or 2 M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1520 may include an interrupt control and distribution unit 1511 for generating interrupts and other communications to other portions of a processor or electronic device. In one embodiment, bus interface unit 1520 may include a snoop control unit 1512 that handles cache access and coherency for multiple processing cores. In a further embodiment, to provide such functionality, snoop control unit 1512 may include a cache-to-cache transfer unit that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1504 may include a load store unit 1530 for storing information such as buffers written to or read back from memory or registers. In another embodiment, memory system 1504 may include a translation lookaside buffer (TLB) 1545 that provides look-up of address values between physical and virtual addresses. In yet another embodiment, bus interface unit 1520 may include a memory management unit (MMU) 1544 for facilitating access to virtual memory. In still yet another embodiment, memory system 1504 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556.

Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
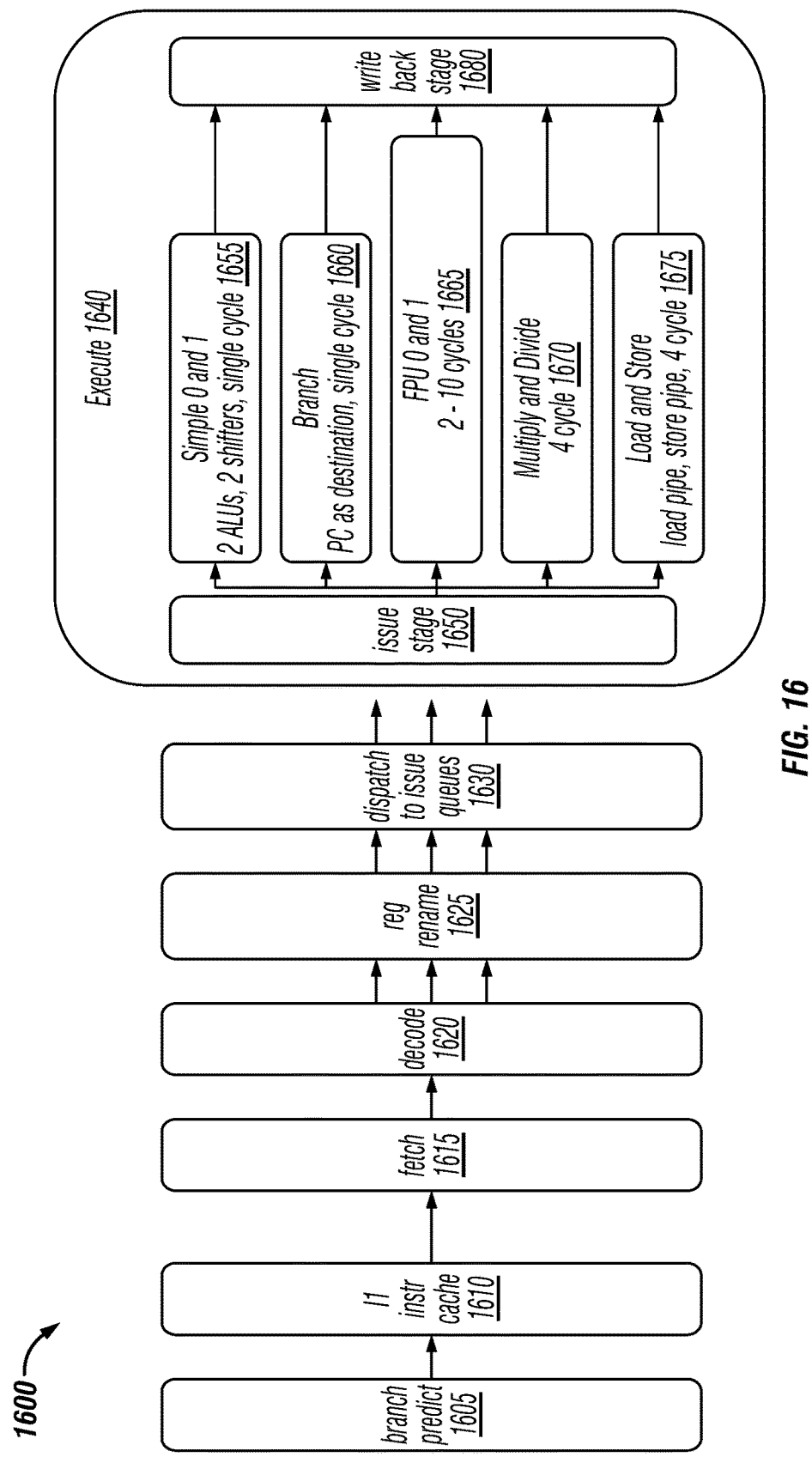
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
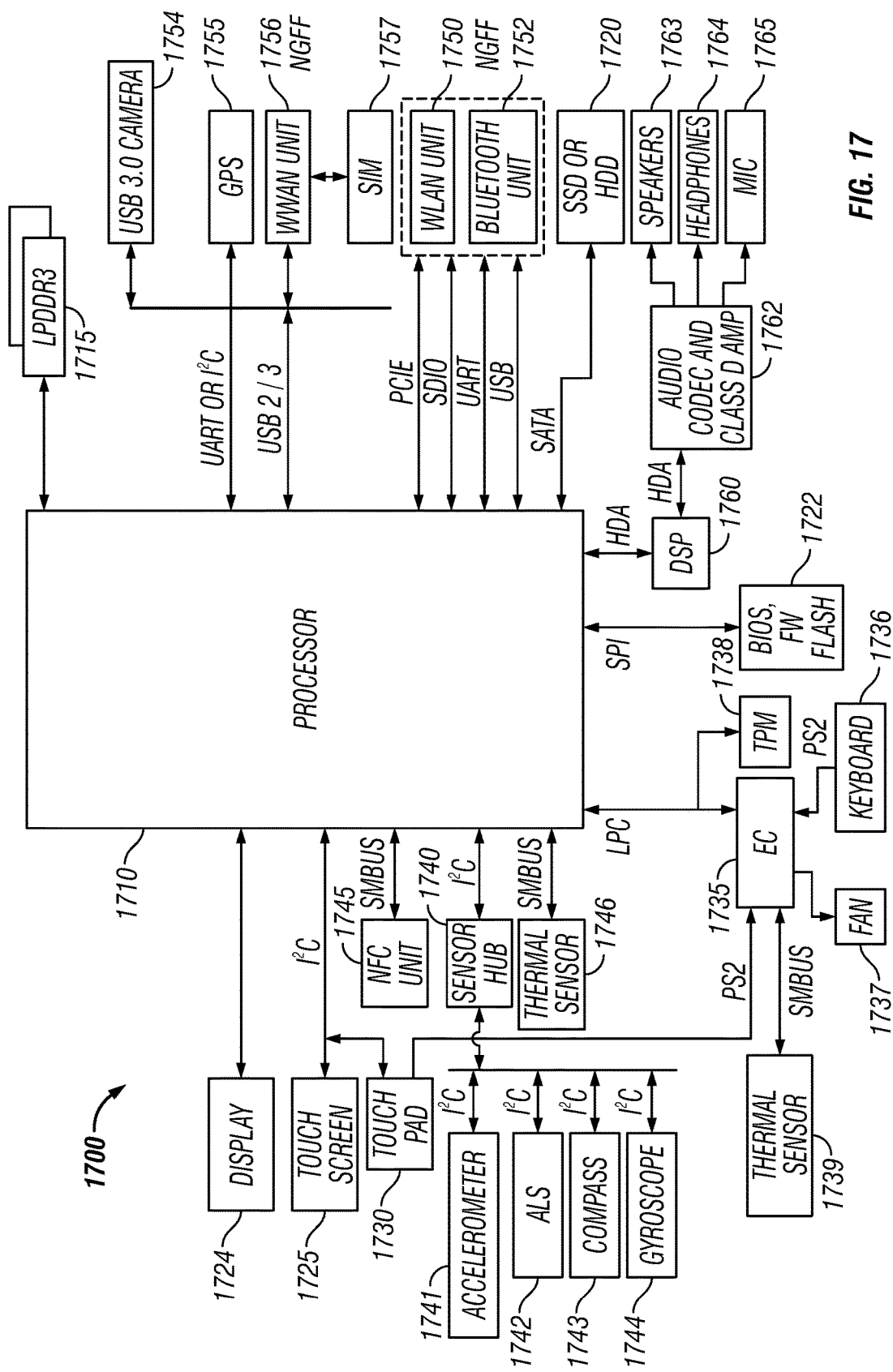
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as I²C bus, system management bus (SM-Bus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS), a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1746, and touch pad 1730 may be communicatively coupled to EC 1735. Speaker 1763, headphones 1764, and a microphone 1765 may be communicatively coupled to an audio unit 1764, which may in turn be communicatively coupled to DSP 1760. Audio unit 1764 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
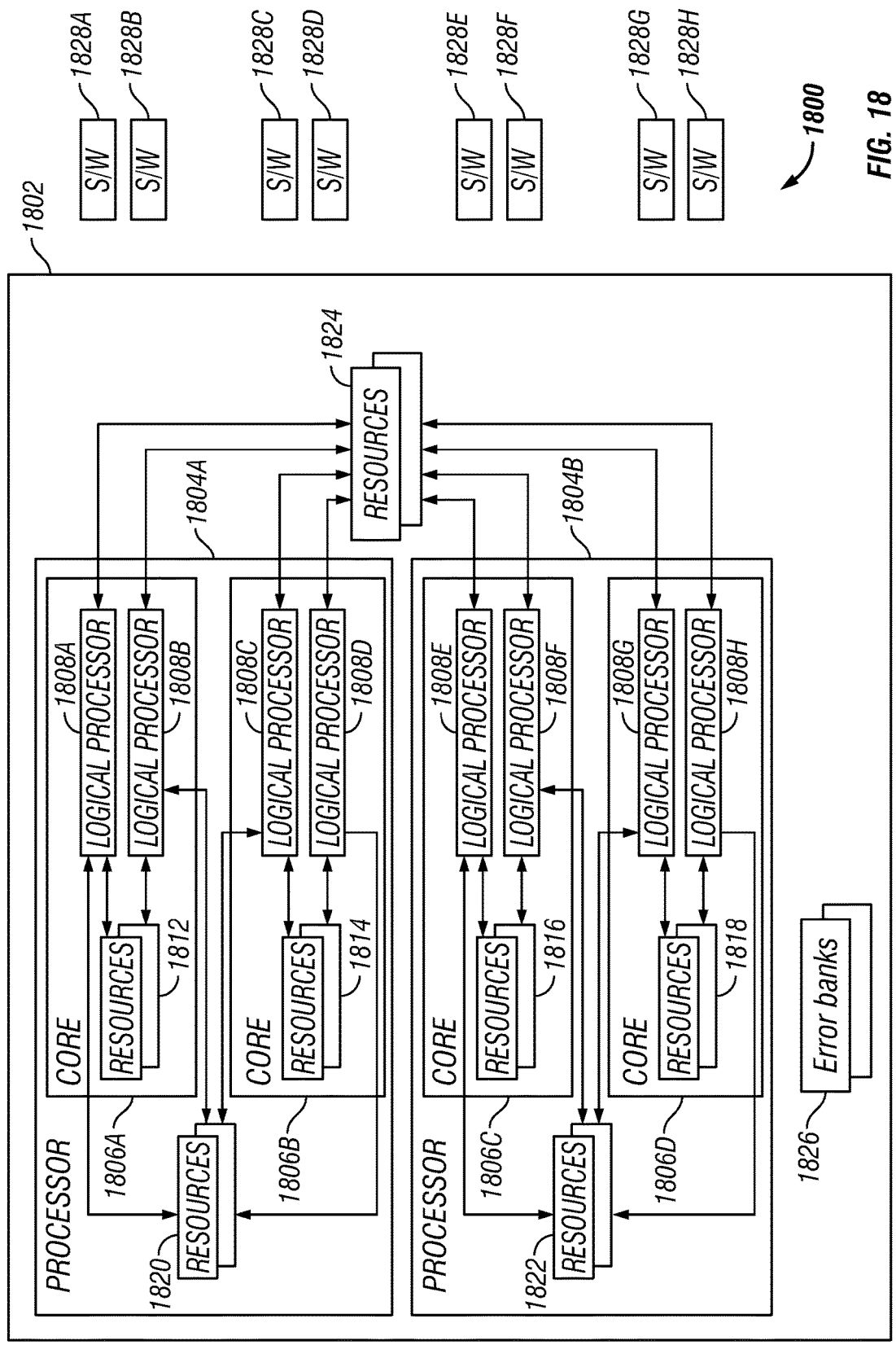
FIG. 18 illustrates an example embodiment of a system for implementing an instruction for machine checking communication, in accordance with embodiments of the present disclosure.

Embodiments of the present disclosure involve an instruction and logic for machine checking communication. FIG. 18 illustrates an example embodiment of a system 1800 for implementing such an instruction and logic for machine checking communication, in accordance with embodiments of the present disclosure.

System 1800 may include a processor package 1802. In one embodiment, processor package 1802 may be implemented in a single die package. Processor package 1802 may be included in any suitable computing system or electronic device, such as system 1800. Processor package 1802 may include a plurality of processing entities, logical or physical, which may support execution for one or more instances of software 1828A-1828H. Each of software 1828A-1828H may be implemented by different software threads, instances, applications, operating systems, virtual machines, or other software entities. In one embodiment, one or more of software 1829A-1828H may be included within a hierarchy. For example, software 1829A-1828H may each represent a thread wherein all such threads are operating on the same operating system instance.

Processor package 1802 may include any suitable number and kind of processors. Such processors may each be implemented in the same or in different manners. For example, processor package 1802 may include processor 1804A and processor 1804B, each implemented in the same manner. In one embodiment, system 1800 may perform machine checking communication through any of the instances of processors within processor package 1802. Processor package 1802 may include any suitable number and kind of resources 1824. Resources 1824 may include any suitable component for execution or assistance in execution such as, for example, registers, memory, caches, sockets, ports, busses, or peripherals. In one embodiment, various elements of processor package 1802, such as logical or physical processors, may share access to resources 1824.

Each processor 1804 may be implemented in any suitable manner, such as using the elements shown in FIGS. 1-17 above. In one embodiment, processor 1804 may include processing cores. Each processor 1804 may include any suitable number and kind of processing cores. For example, processor 1804A may include core 1806A and core 1806B, and processor 1804B may include core 1806C and core 1806D. Each processor 1804 may include any suitable number and kind of resources. For example, processor 1804A may include resources 1820 and processor 1804B may include resources 1822. Resources 1820 and resources 1822 may include any suitable component for execution or assistance in execution such as registers, memory, caches, sockets, ports, busses, or peripherals. In one embodiment, various elements of a processor, such as cores of the processor, may share access to resources. For example, various elements of processor 1804A, such as core 1806A and core 1806B, may share access to resources 1820. Various elements of processor 1804B, such as core 1806C and core 1806D, may share access to resources 1822. Furthermore, cores 1806A, 1806B, 1806C, 1806D may share access to resources 1824 of processor package 1802.

Each core 1806 may be implemented in any suitable manner, such as using the elements shown in FIGS. 1-17 above. In one embodiment, each core 1806 may include any suitable number and kind of logical processors. For example, core 1806A may include logical processor 1808A and logical processor 1808B. Core 1806B may include logical processor 1808C and logical processor 1808D. Core 1806C may include logical processor 1808E and logical processor 1808F. Core 1806D may include logical processor 1808G and logical processor 1808H. Each processor core 1806 may include any suitable number and kind of resources. For example, core 1806A may include resources 1812, core 1806B may include resources 1814, core 1806C may include resources 1816, and core 1806D may include resources 1818. Resources 1820 and resources 1822 may include any suitable component for execution or assistance in execution such as, for example, registers, memory, caches, sockets, ports, busses, or peripherals. In one embodiment, various elements of a core, such as logical processors, may share access to resources. For example, various elements of core 1806A, such as logical processor 1808A and logical processor 1808B, may share access to resources 1812. Various elements of core 1806B, such as logical processor 1808C and logical processor 1808D, may share access to resources 1814. Various elements of core 1806C, such as logical processor 1808E and logical processor 1808F, may share access to resources 1816. Various elements of core 1806D, such as logical processor 1808G and logical processor 1808H, may share access to resources 1818. Various elements of processor 1804A, such as logical processors 1808A, 1808B, 1808C, 1808D, may share access to resources 1820. Various elements of processor 1804B, such as logical processors 1808E, 1808F, 1808G, 1808H, may share access to resources 1822. Furthermore, logical processors 1808A, 1808B, 1808C, 1808D, 1808E, 1808F, 1808G, 1808H may share access to resources 1824 of processor package 1802.

Each logical processor 1808 may be implemented in any suitable manner, such as using the elements shown in FIGS. 1-17 above. In one embodiment, a logical processor may be implemented as a logical core of a physical core. For example, each logical processor 1808 may be implemented as a logical core of core 1806. In another embodiment, logical processors 1808 may provide multithreading operation in processor package 1802. Such multithreading may be accomplished by, for example, time sliced fetching and decoding and simultaneous multithreading thereafter.

In one embodiment, each logical processor 1808 may correspond to an instance of software 1828. Thus, a logical processor 1808 may execute the corresponding software 1828 wherein, for example, software 1828 represents a thread that is executing on the corresponding logical processor 1808. Given a number N of logical processors 1808 in processor package 1802, a corresponding number N of threads embodied in software 1828 may be possibly executed. In another embodiment, each software 1828 may share access to various resources of processor package 1802 to the extent that the corresponding logical processor 1808 shares access to such resources.

Processor package 1802 may experience errors with regards to one or more of resources 1812, 1814, 1816, 1818, 1820, 1822, 1824. In one embodiment, such errors may be detected while performing machine checking on a respective resource. Logical processors 1808, as well as corresponding software 1828, may need to be notified with respect to the encountered error. In another embodiment, processor package 1802 may selectively notify logical processors 1808 and software 1828 with the results of the machine checking. Thus, processor package 1802 may notify logical processors 1808 and software 1828 using selective machine checking communication.

In one embodiment, for an error in a given resource, processor package 1802 may notify only logical processors 1808 and software 1828 that share access to the given resource. In a further embodiment, processor package 1802 may notify only a single one of logical processors 1808 and software 1828 that share access to the given resource. In another embodiment, processor package 1802 may provide error information to a single one of logical processors 1808 and software 1828 that share access to the given resource. In yet another embodiment, processor package 1802 may provide error information to a responsible one of logical processors 1808 and software 1828.

Processor package 1802 may include any suitable number and kind of error banks 1826. Each of error banks 1826 may be implemented in any suitable manner. In one embodiment, error banks 1826 may be implemented by one or more registers. In one embodiment, processor package 1802 may include an error bank 1826 for each resource that is shared by multiple elements of processor package 1802. In another embodiment, processor package 1802 may include a single error bank 1826 that accounts for each resource shared by multiple elements of processor package 1802. Error banks 1826 may include any suitable kind and type of information for tracking errors in resources as well as identification of related logical processors 1808 and software 1828. Although error banks 1826 are illustrated as included within processor package 1802, error banks 1826 may be implemented in any portion of processor package 1802, such as in a specific processor 1804 or core 1806.

In one embodiment, processor package 1802 may record information concerning errors encountered in its resources. In a further embodiment, such information may be recorded in error banks 1826. The information may identify the error and the affected resource. In one embodiment, the information may identify the last entity, such as logical processor 1808, that accessed or attempted to access the resource. In another embodiment, the information may identify the responsible entity, such as logical processor 1808, for handling the error.

Processor package 1802 may notify one or more of logical processors 1808A-1808H or software 1828A-1828H through any suitable mechanism or manner. In one embodiment, processor package 1802 may make error notifications through an interrupt. In a further embodiment, such an interrupt may include a corrected machine check interrupt (CMCI). In another, further embodiment, such an interrupt may include a systems management interrupt (SMI). An interrupt may be sent to a given logical processor 1808 which may then send the interrupt to its corresponding software 1828. In another embodiment, processor package 1802 may make error notifications through a message. In a further embodiment, such a message may include a machine check error (MCE) message. A message may be sent to a given logical processor 1808 which may then send the message to its corresponding software 1828.

The communication sent by processor package 1802 to logical processor 1808 and software 1828 may include any suitable information. However, full details of an error causing the communication might not be fully included in such communication due to space constraints. Furthermore, the communication might need to be acknowledged by software 1828 wherein software 1828 may clear an error, signaling to other portions of system 1800 that the error has been handled. Full details of an error may be stored in any suitable portion of processor package 1802, such as in error banks 1826. Consequently, in one embodiment upon receipt of machine checking communication, software 1828 may access portions of processor package 1802 to learn more information about the error, handle the error, and clear the error. Software 1828 may thus access, for example, error banks, upon receipt of machine checking communication.

In some circumstances, only a single instance of software 1828 might be required to handle an error and clear an error. Thus, in one embodiment only a single instance of software 1828 might be notified with an interrupt or message regarding machine checking communication. In another embodiment, multiple instances of software 1828 may be notified with an interrupt or message regarding machine checking communication but, upon an additional inquiry by software 1828, only a single instance of software 1828 might receive additional information regarding machine checking communication.

Processor package 1802 may determine errors in shared resources through any suitable machine checking process. Some errors may be correctable. An individual, corrected error in a shared resource might not require reporting, either generally or selectively, to software 1828. However, when a number of corrected errors exceeds a designated threshold, reporting may be necessary as the count of errors may indicate a larger problem. Furthermore, some errors may be uncorrectable and reporting of such errors may be required immediately. Processor package 1802 may use any suitable basis for determining that error reporting should be performed through machine checking communication. In one embodiment, processor package 1802 may determine that a certain number of corrected errors has occurred and determine that error reporting is to be performed. In another embodiment, processor package 1802 may determine that an uncorrected error has occurred and determine that error reporting is to be performed. After determining an error, subsequent machine checking may result in repeated determinations of a previously determined error, wherein the error has not yet been handled. In yet another embodiment, processor package 1802 may ignore or suppress communication for such repeated determinations of errors wherein the errors have not yet been handled, as such communication may be superfluous.

Although processor package 1802 has been described above and will be described herein according to various embodiments, such embodiments may be implemented in any suitable portion of processor package 1802, such as a specific processor 1804 or core 1806. Furthermore, processor package 1802 may be implemented in multiple ones of processors 1804 or cores 1806.

Figure 19:
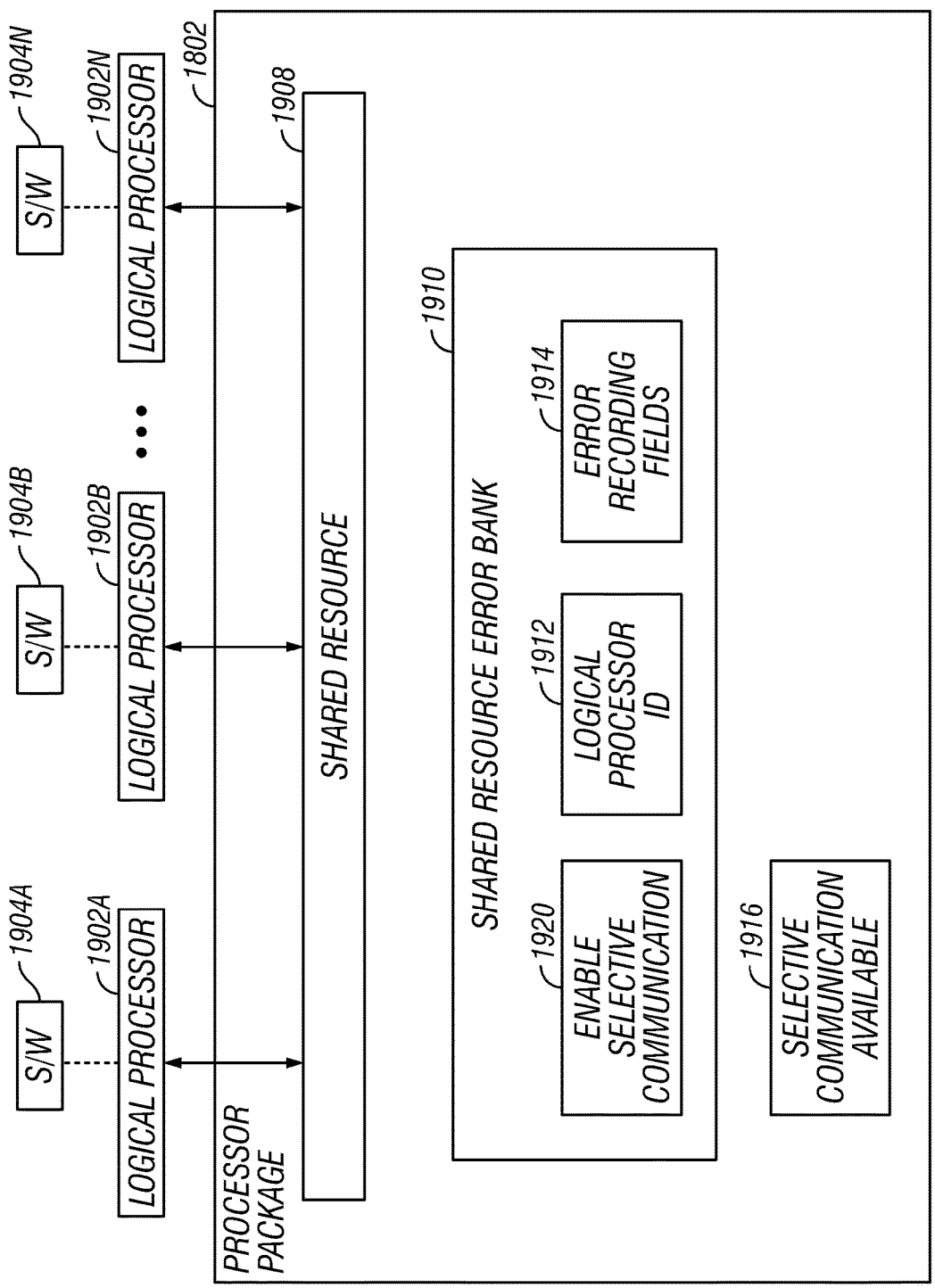
FIG. 19 is a more detailed illustration of a system for providing machine checking communication, in accordance with embodiments of the present disclosure.

FIG. 19 is a more detailed illustration of system 1800 for providing machine checking communication, in accordance with embodiments of the present disclosure. In one embodiment, system 1800 may provide selective machine checking communication by implementing an identifier of a responsible logical processor in error checking mechanisms of processor package 1802.

Processor package 1802 may include a shared resource 1908, which may implement any one of resources 1812, 1814, 1816, 1818, 1820, 1822, 1824. In one embodiment, shared resource 1908 may be shared by a plurality of logical processors 1902A-1902N. Each of logical processors 1902A-1902N may implement one of logical processors 1808 of FIG. 18. In one embodiment, each of logical processors 1902A-1902N may execute corresponding software 1904A-1904N. Each of software 1904A-1904N may implement one of software 1804 of FIG. 18. Although each of logical processors 1902A-1902N is illustrated as associated with one of software 1904A-1904N, in another embodiment a given one of logical processors 1902A-1902N may be associated with no software at any given time. Such a situation may occur, for example, when the number of threads required in system 1800 is less than the number of available logical processors 1902A-1902N.

Logical processors 1902A-1902N may implement a subset of the logical processors 1808 of FIG. 18. In one embodiment, logical processors 1902A-1902N may share access to one or more resources. In another embodiment, logical processors 1902A-1902N may illustrate only those logical processors 1808 that are presently sharing access to a particular resource, such as shared resource 1908. The number and identify of logical processors accessing shared resource 1908 may change over time. Thus, logical processors 1902A-1902N may illustrate a subset of the logical processors of processor package 1802.

Although access to a single resource—shared resource 1909—is illustrated in FIG. 19, access to other resources of processor package 1802 may occur simultaneously. Such access may include access by one or more of logical processors 1902A-1902N. While the access of other resources of processor package 1802 is not illustrated, the access described herein in conjunction with shared resource 1908 may be replicated for other such resources.

In FIG. 19, logical processors 1902A-1902N are shown outside processor package 1802 for the purposes of illustration only. Logical processors 1902A-1902N are located inside processor package 1802. The handling of access of resources such as shared resource 1908 may be conducted through various elements of processor package 1802.

Processor package 1802 may include any suitable number, type, or combination of elements to implement error banks 1826. For example, processor package 1802 may include a shared resource error bank 1910 and a structure 1916 for indicating that selective machine checking communication is available.

Structure 1916 may be implemented in any suitable manner, such as by a bit, flag, register, file, memory location, cache, or other suitable entity. In one embodiment, structure 1916 may be implemented by bits on a MSR. In another embodiment, structure 1916 may be set by processor package 1802 to indicate that selective machine checking communication is available from processor package 1802 to software accessing shared resources. For example, upon determination of an error, processor package 1802 may selectively communicate to a single one of software 1904A-1904N sharing access to shard resource 1908. Such a capability, as opposed to broadcasting the communication to all software 1904A-1904N, may be communicated in one embodiment by setting a flag or bit in structure 1916. In a further embodiment, upon initialization, each instance of software 1904A-1904N may read structure 1916 and thus be informed that the capability of selective machine checking communication is available from processor package 1802.

Shared resource error bank 1910 may be implemented in any suitable manner, such as by a register, file, memory location, cache, or other suitable entity. In one embodiment, shared resource error bank 1910 may correspond to an instance of a shared resource, such as shared resource 1908. In another embodiment, processor package 1802 may include a shared resource error bank for each resource that is shared by multiple logical processors, cores, or processors. Shared resource error bank 1910 may be stored in any suitable location of processor package 1802.

Shared resource error bank 1910 may include any suitable number, kind, or combination of bits, fields, flags, indicators, memory locations, data structures, or other suitable entities to store information related to selective machine checking communication. For example, shared resource error bank 1910 may include a structure 1920 for indicating whether selective machine checking communication has been enabled, a structure 1912 for indicating an identity of a logical processor, and a structure 1914 for indicating the nature of one or more errors that have been encountered. Each of structures 1912, 1914, 1920 may be implemented in any suitable manner, such as by a flag, bit, register, data structure, or portion or combination thereof. In one embodiment, structure 1920 may be implemented by a bit on a model-specific register (MSR). In another embodiment, structure 1914 may be implemented by a range of bits on a MSR. In yet another embodiment, structure 1912 may be implemented by a range of bits on a MSR.

Based on a determination that selective machine checking communication is available from processor package 1802, software 1902 may elect to receive such communication. In one embodiment, a given instance of software 1902 may issue a write to structure 1920 indicating that selective communication is to be used. In order to perform the write, software 1904 may utilize any suitable command, such as a wrmsr instruction. In another embodiment, by setting structure 1920, a specific instance of software 1904 may thus indicate that selective machine checking communication has been chosen for all instances of software 1904 using shared resource 1908.

Processor package 1802 may determine whether software has opted-in to receive selective machine checking communication by, for example, evaluating structure 1920. In one embodiment, upon determining that at least one logical processor has opted-in for selective machine checking communication, processor package 1802 may perform selective machine checking communication for logical processors and software associated with shared resource 1908.

In one embodiment, processor package 1802 may determine to which logical processor 1902 and software 1904 selective machine checking communication should be directed. In a further embodiment, to make the determination processor package 1802 may record an identification of a particular logical processor 1902 in structure 1912. Any suitable manner or mechanism of identifying a particular logical processor 1902 may be used. For example, the identification of a particular logical processor 1902 may be defined such that the particular logical processor 1902 is uniquely identified throughout system 1800, within processor package 1802, within a particular processor 1804, or within a particular core 1806. Furthermore, the identification of a particular logical processor 1902 may be defined within the scope of logical processors using shared resource 1908, which might require translation into a unique identifier for the particular logical processor 1902. Such translation may be performed, for example, using a look-up table. Thus, in one embodiment a particular logical processor may be defined in absolute, unique terms. In another embodiment, a particular logical processor may be defined in relative terms. In yet another embodiment, a particular logical processor 1902 may be identified by an Advanced Programmable Interrupt Controller (APIC) identifier. In still yet another embodiment, a particular logical processor 1902 may be identified by a logical processor identifier.

The particular logical processor 1902 identified in structure 1912 may be changed. The change may arise from processor package 1802 or one or more software 1904. The change may be necessitated by, for example, the particular logical processor 1902 going off-line, having no threads or software to execute, or an error. A given instance of software 1904 may initiate the change by, for example, issuing a rewrite of structure 1920. Processor package 1802 may repeat the steps of assigning a particular logical processor 1902 to structure 1912 upon such a rewrite of structure 1920. In one embodiment, processor package 1802 may designate the identity of the logical processor 1902 that performed the rewrite of structure 1920.

Processor package 1802 may populate structure 1914 with any suitable information about errors that have been encountered and that have caused the need for selective machine checking communication. For example, processor package 1802 may populate structure 1914 with error codes, corrected error codes, counts of errors encountered, identifiers of affected components, flags, or any other suitable information. In one embodiment, structure 1914 may be accessed by an instance of software 1904 after receipt of selective machine checking communication. Software 1904 may take any suitable corrective action based upon the information included within structure 1914. After corrective action has been taken, software 1904 may clear structure 1914 fully or in part to indicate to other portions of system 1800 that the error has been handled.

Figure 20:
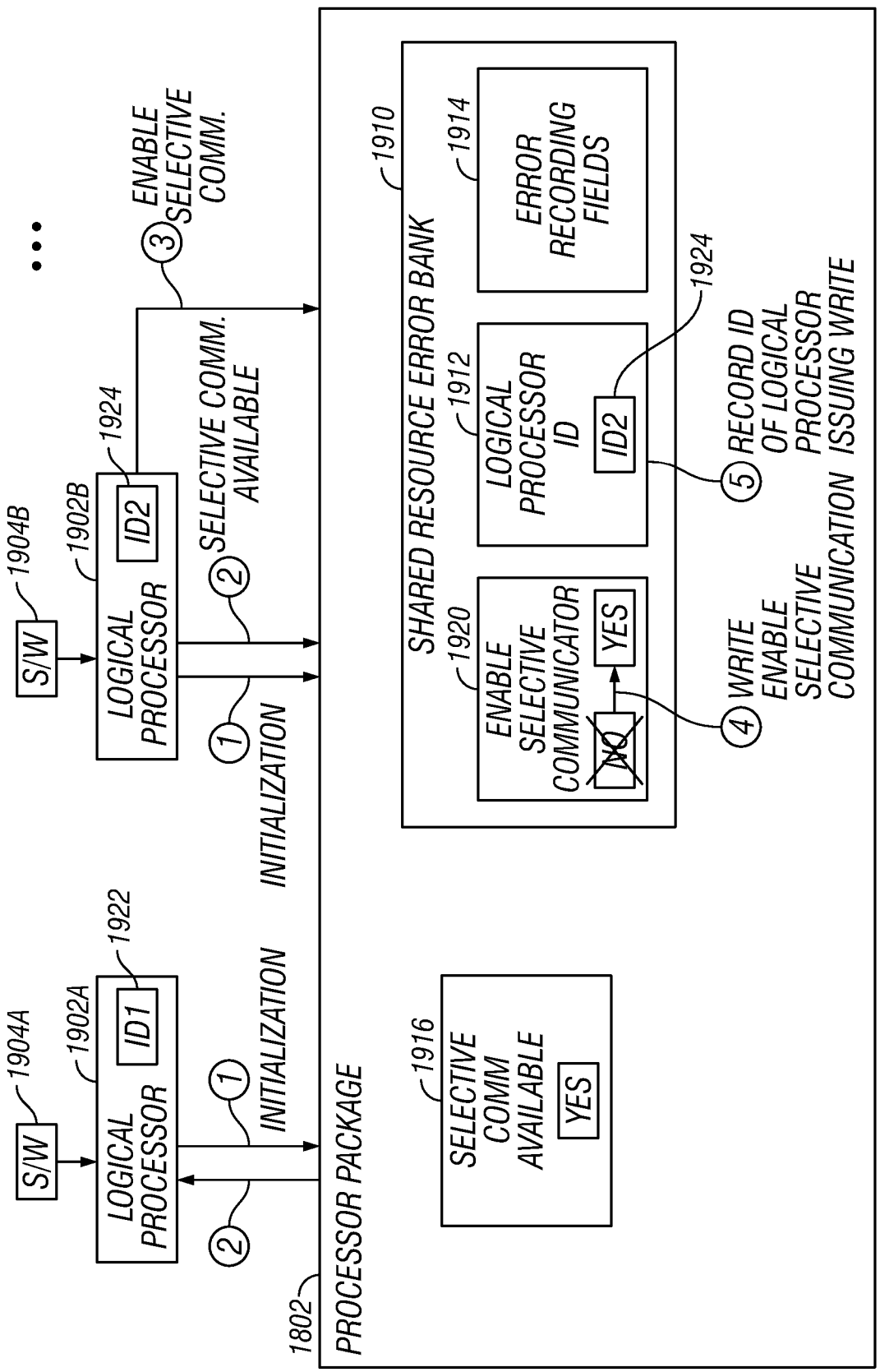
FIG. 20 is an illustration of example operation of system to perform initialization, in accordance with embodiments of the present disclosure.

In one embodiment, information entered into structure 1914 may not be included in selective machine checking communication. Particular implementations of selective machine checking communication in, for example, interrupts, may have insufficient space to communication such information. Accordingly, software 1904 might not receive information in structure 1914 upon receipt of selective machine checking communication. Software 1904 might only receive such information from structure 1914 after first receiving selective machine checking communication and then issuing a read FIG. 20 is an illustration of example operation of system 1800 to perform initialization, in accordance with embodiments of the present disclosure.

At (1), each instance of software 1904 running through a respective logical processor 1902 that utilizes shared resource 1908 may begin initialization of machine checking communication. Although software 1904A, 1904B and logical processor 1902A, 1902B are illustrated, any suitable number of software 1904 and logical processors 1902 may be operating in the manner illustrated. In one embodiment, initialization may include a read of structure 1916, which may indicate that selective machine checking communication is available on processor package 1802 for a given shared resource 1908.

At (2), the availability of selective machine checking communication may be communicated to each instance of logical processor 1902 and software 1904. For example, in processor package 1802 for the given shared resource 1908, selective machine checking communication may be available and thus communicated.

In one embodiment, at (3), each instance of software 1904 through the respective logical processor 1902 may choose whether selective machine checking communication will be used. For example, a specific logical processor, such as logical processor 1902B, may issue a command or write designating that selective machine checking communication is to be enabled. In a further embodiment, at (4), the choice to enable selective machine checking communication may be written to structure 1920.

At (5), the identity of the logical processor 1902 to which selective machine checking communication will be made may be written to structure 1912. In one embodiment, the identity of the logical processor which enabled selective communication may be written to structure 1912. For example, logical processor 1902A may have an identification 1922 of "ID1" and logical processor 1902B may have an identification 1924 of "ID2". Thus, processor package 1802 may write an indication of "ID2" to structure 1912. The indication may be stored in a specific field 1924.

Figure 21:
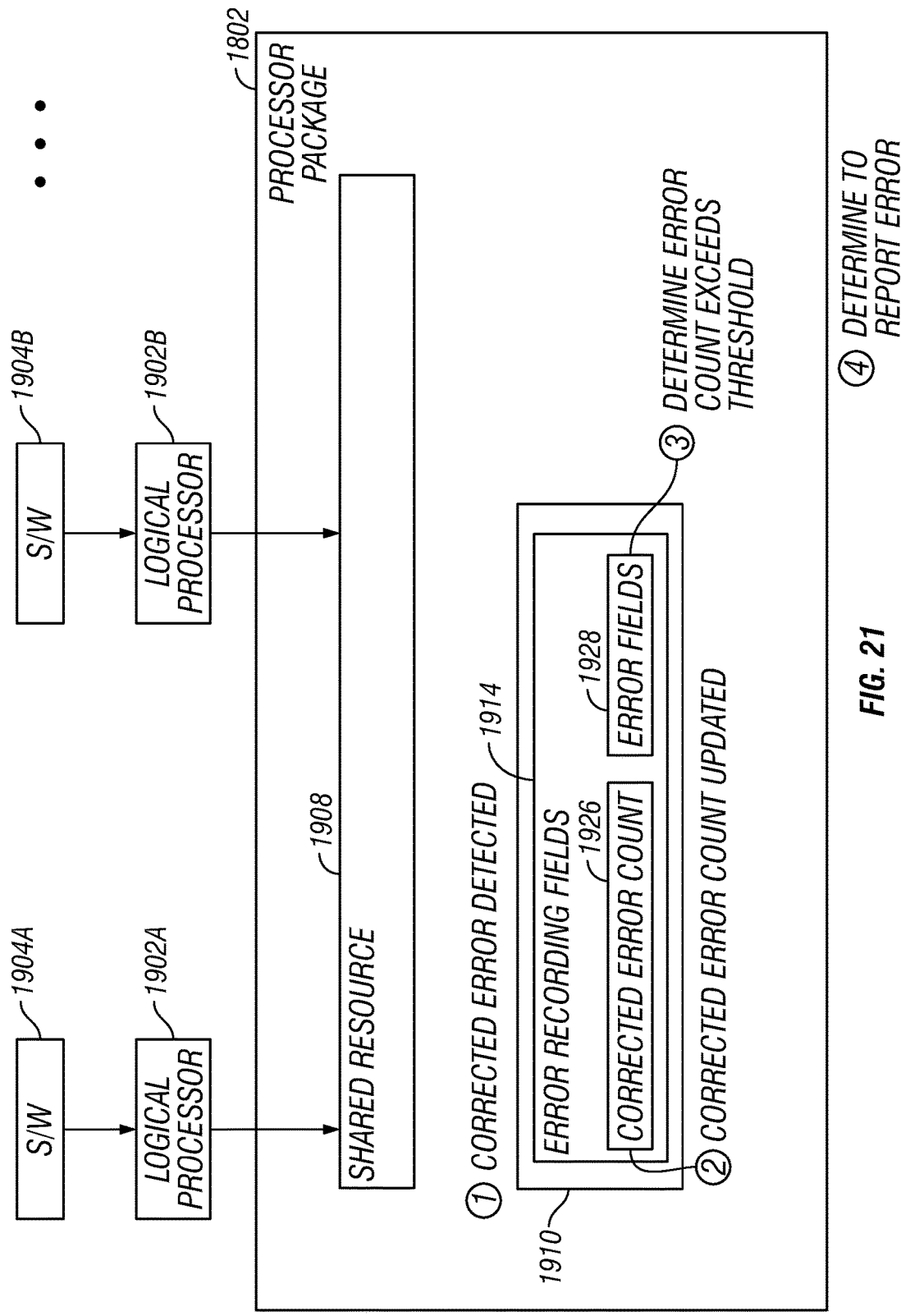
FIG. 21 is an illustration of example operation of system to determine whether to conduct error reporting, in accordance with embodiments of the present disclosure.

FIG. 21 is an illustration of example operation of system 1800 to determine whether to conduct error reporting, in accordance with embodiments of the present disclosure. The error reporting may be carried out by processor package 1802 performing selective machine checking communication. In one embodiment, processor package 1802 may determine whether to conduct error reporting based upon corrected errors.

At (1), processor package 1802 may detect a correctable error for shared resource 1908. In one embodiment, at (2), processor package 1802 may increment a count 1926 of corrected errors for shared resource 1908. Count 1926 may be stored, for example, in structure 1914 within shared resource error bank 1910. Count 1926 may be implemented in any suitable manner, such as by a series of bits, register, field, data structure, or other entity.

At (3), processor package 1802 may determine that the number of corrected errors for shared resource 1908 has exceeded a specified threshold above which correction or additional analysis is to be made. In one embodiment, processor package 1802 may set suitable information in error fields 1928 indicating the condition. At (4), processor package 1802 may determine to report the error to a responsible software instance. In one embodiment, the reporting may be accomplished through selective machine checking communication.

Figure 22:
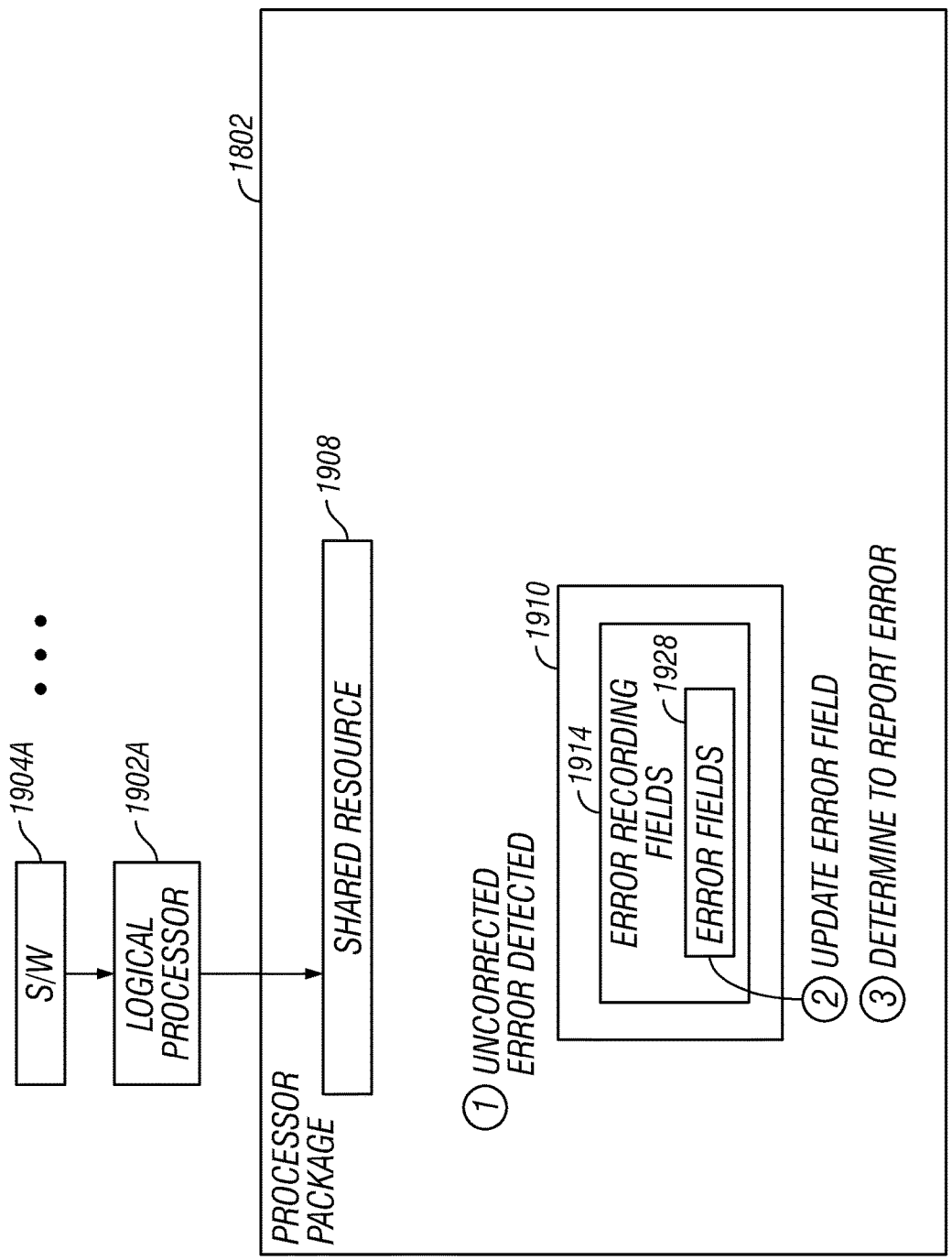
FIG. 22 is an illustration of further example operation of system to determine whether to conduct error reporting, in accordance with embodiments of the present disclosure.

FIG. 22 is an illustration of further example operation of system 1800 to determine whether to conduct error reporting, in accordance with embodiments of the present disclosure. In one embodiment, processor package 1802 may determine whether to conduct error reporting based upon uncorrected errors At (1), processor package 1802 may detect an uncorrectable error for shared resource 1908. At (2), information about the error may be recorded in shared resource error bank 1910, such as in various error fields 1928 of structure 1914. At (3), processor package 1802 may determine to report the error to a responsible software instance. In one embodiment, the reporting may be accomplished through selective machine checking communication.

Figure 23:
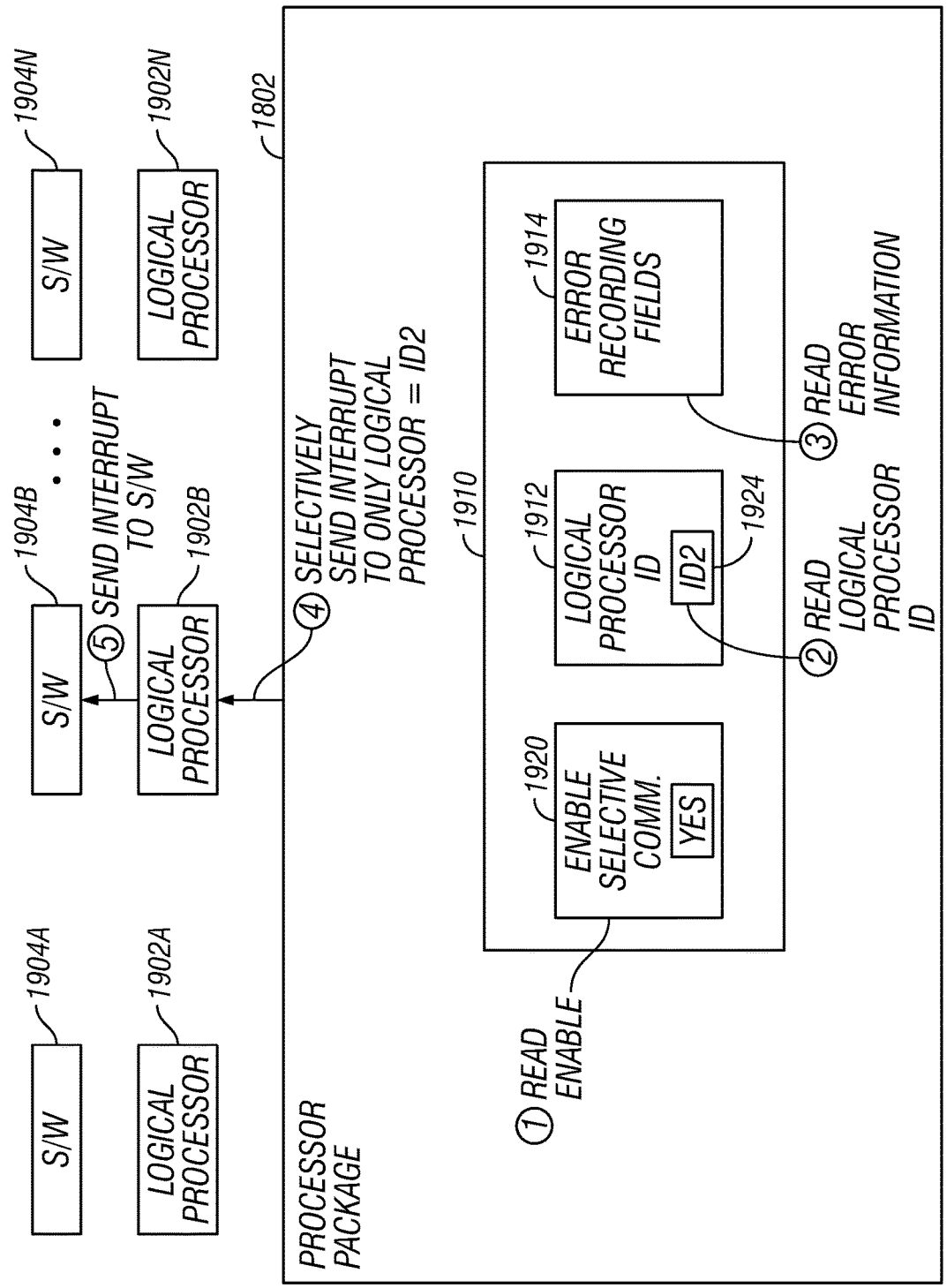
FIG. 23 is an illustration of example operation of system to perform selective machine checking communication through a single logical processor associated with a shared resource, in accordance with embodiments of the present disclosure.

FIG. 23 is an illustration of example operation of system 1800 to perform selective machine checking communication through a single logical processor associated with a shared resource, in accordance with embodiments of the present disclosure. This operation may be predicated upon a determination by, for example, processor package 1802 that an error condition exists for which reporting must be made. In one embodiment, the determination may be made by evaluating corrected errors, such as by the operations as illustrated in FIG. 21. In another embodiment, the determination may be made by evaluating uncorrected errors, such as by the operations as illustrated in FIG. 22.

At (1), processor package 1802 may read structure 1920 to determine whether any elements of system 1800 have enabled, authorized, or otherwise requested to use selective machine checking communication. Such an enablement may have been made by one of software 1904 issuing a write command to set a bit of structure 1920. In another embodiment, if selective communication has not been enabled, processor package 1802 may send notifications through all logical processors 1902A-1902N using shared resource 1908. In yet another embodiment, if selective communication has been enabled, processor package 1802 may send notifications through a single one of logical processors 1902A-1902N.

At (2), based upon a determination that selective communication has been enabled, processor package 1802 may read a logical processor identification from structure 1912. For example, after determining that selective communication is enabled in structure 1920, processor package 1802 may read "ID2" from field 1924. The logical processor identification may indicate which of logical processors 1902A-1902N will receive selective machine checking communication. In one embodiment, at (3), processor package 1802 may read any necessary information concerning the errors, such as an identification of the error or the affected resource, from structure 1914. Such information concerning the errors may be included in a message sent to a specific logical processor. In another embodiment, processor package 1802 may omit such information in a message sent to a specific logical processor.

At (4), processor package 1802 may send an interrupts or message to a single one of logical processors 1902A-1902N, thereby conducting selective machine checking communication. For example, processor package 1802 may send an interrupt selectively to logical processor 1902B matching the processor identification "ID2," while not sending the interrupt to any other logical processors 1902A-1902N. At (5), the interrupt or message may be sent to software 1904B for error handling.

Figure 24:
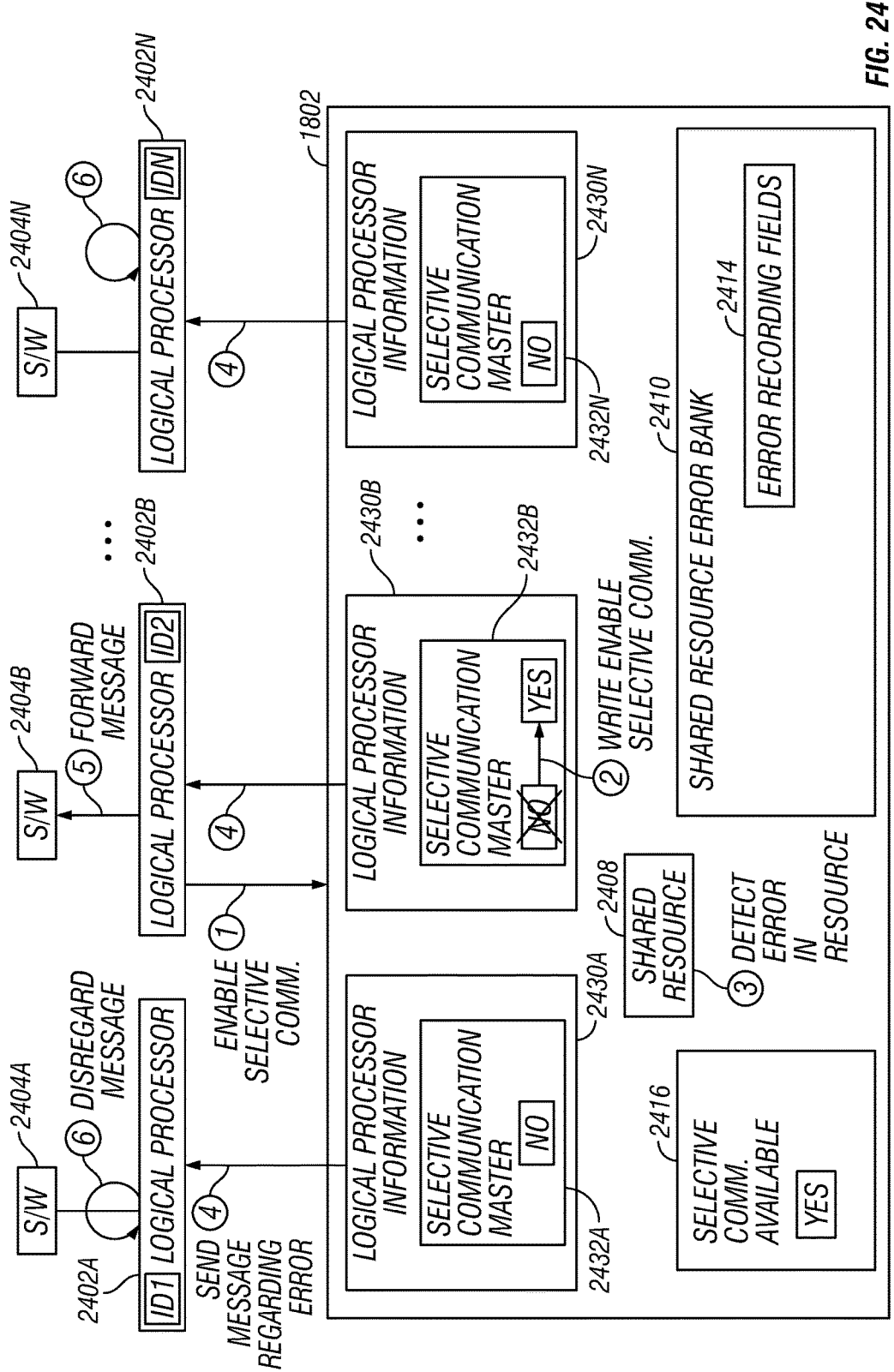
FIG. 24 is a more detailed illustration of a system for providing machine checking communication, in accordance with other embodiments of the present disclosure.

FIG. 24 is a more detailed illustration of system 1800 for providing machine checking communication, in accordance with other embodiments of the present disclosure. In one embodiment, system 1800 may provide selective machine checking communication by implementing an identifier of a responsible logical processor in elements associated with the responsible logical processor.

Processor package 1802 may include a shared resource 2408, which may implement any one of resources 1812, 1814, 1816, 1818, 1820, 1822, 1824. In one embodiment, shared resource 2408 may be shared by a plurality of logical processors 2402A-2402N. Each of logical processors 2402A-2402N may implement one of logical processors 1808 of FIG. 18. In one embodiment, each of logical processors 2402A-2402N may execute corresponding software 2404A-2404N. Each of software 2404A, 2404B may implement one of software 1804 of FIG. 18. Although each of logical processors 2402A-2402N is illustrated as associated with one of software 2404A-2404N, in another embodiment a given one of logical processors 2402A-2402N may be associated with no software at any given time. Such a situation may occur, for example, when the number of threads required in system 1800 is less than the number of available logical processors 2402A-2402N.

Logical processors 2402A-2402N may implement a subset of the logical processors 1808 of FIG. 18. In one embodiment, logical processors 2402A-2402N may share access to one or more resources. In another embodiment, logical processors 2402A-2402N may illustrate only those logical processors 1808 that are presently sharing access to a particular resource, such as shared resource 2408. The number and identify of logical processors accessing shared resource 2408 may change over time. Thus, logical processors 2402A-2402N may illustrate a subset of the logical processors of processor package 1802. While the access of other resources of processor package 1802 is not illustrated, the access described herein in conjunction with shared resource 2408 may be replicated for other such resources. Logical processors 2402A-2402N are shown outside processor package 1802 for the purposes of illustration only. Logical processors 2402A-2402N are located inside processor package 1802. The handling of access of resources such as shared resource 2408 may be conducted through various elements of processor package 2402.

Processor package 1802 may include any suitable number, type, or combination of elements to implement error banks 1826. For example, processor package 1802 may include a shared resource error bank 2410 and a structure 2416 for indicating that selective machine checking communication is available.

Structure 2416 may be implemented in any suitable manner, such as by a bit, flag, register, file, memory location, cache, or other suitable entity. Structure 2416 may be implemented and operated upon in similar fashion to structure 1916, described above. In one embodiment, structure 2416 may be implemented by bits on an MSR.

Shared resource error bank 2410 may be implemented in any suitable manner, such as by a register, file, memory location, cache, or other suitable entity. In one embodiment, shared resource error bank 2410 may correspond to an instance of a shared resource, such as shared resource 2408. In another embodiment, processor package 1802 may include a shared resource error bank for each resource that is shared by multiple logical processors, cores, or processors. Shared resource error bank 2410 may be stored in any suitable location of processor package 1802.

Shared resource error bank 2410 may include any suitable number, kind, or combination of bits, fields, flags, indicators, memory locations, data structures, or other suitable entities to store information related to selective machine checking communication. For example, shared resource error bank 2410 may include a structure 2414 for indicating the nature of one or more errors that have been encountered. Structure 2414 may be implemented in any suitable manner, such as by a flag, bit, register, data structure, or portion or combination thereof. In one embodiment, structure 2414 may be implemented by a range of bits on a MSR.

Processor package 1802 may include one or more fields for storing and utilizing information for the operation of logical processors. For example, processor package 1802 may include fields 2430A-2430N, each corresponding to a respective one of logical processors 2402A-2402N. Fields 2430A-2430N may be implemented in any suitable manner, such as by a bit, flag, indicator, memory location, data structure, or other suitable entity to store information related to logical processors. In one embodiment, fields 2430A-2430N may be implemented in one or more model specific registers. Furthermore, fields 2430A-2430N may be implemented on a single entity or on separate entities. For example, fields 2430A-2430N may be implemented as a bit mask, wherein a single one of fields 2430A-2430N may be indicated by a byte value.

Each field 2430 may include flag 2432 configured to be set and read to enable whether selective communication will be performed through the respective logical processor. In one embodiment, each flag 2432 may be implemented by a bit on a model specific register. Software 2404 may set flag 2432 to designate which of logical processors 2402—and by extension, software 2404—will receive handle selective machine checking communication. In one embodiment, a single flag 2432 among flags 2432A-2432N may be set at any given time.

Based on a determination that selective machine checking communication is available from processor package 1802, software 2402 may elect to receive such communication. In one embodiment, a given instance of software 2402 may issue a write to a single flag 2432 among flags 2432A-2432N indicating that selective communication is to be used. In order to perform the write, software 2404 may utilize any suitable command, such as a wrmsr instruction.

In one embodiment, processor package 1802 may send machine checking communication to all logical processors 2402A-2402N. Each respective logical processor 2402 may then read its respective field 2430 to determine whether to propagate or suppress the machine checking communication. In a further embodiment, each respective logical processor 2402 may read its respective flag 2432 to determine whether to propagate or suppress the machine checking communication.

The given one of flags 2432A-2432N that is set may be changed. The change may arise from processor package 1802 or one or more software 2404. The change may be necessitated by, for example, a given logical processor 2402 going off-line, having no threads or software to execute, or an error. In one embodiment, an instance of software 2404 may initiate the change by, for example, clearing the previously set one of flags 2432A-2432N and setting another one of flags 2432A-2432N.

Processor package 1802 may populate structure 2414 with any suitable information about errors that have been encountered and that have caused the need for selective machine checking communication. For example, processor package 1802 may populate structure 2414 with error codes, corrected error codes, counts of errors encountered, identifiers of affected components, flags, or any other suitable information. Structure 2414 may be accessed by an instance of software 2404 after receipt of selective machine checking communication. Software 2404 may take any suitable corrective action based upon the information included within structure 2414. After corrective action has been taken, software 2404 may clear structure 2414 fully or in part to indicate to other portions of system 1800 that the error has been handled.

In operation, processor package 1802 may perform initialization. In one embodiment, processor package 1802 may perform initialization wherein software 2404 may read structure 2416 to determine that selective machine checking communication is available on processor package 1802 for a given shared resource 2408. In another embodiment, an instance of software 2404 through its respective logical processor 2402 may choose whether selective machine checking communication will be used. Thus, for example, at (1) a specific logical processor, such as logical processor 2402B, may issue a command or write designating that selective machine checking communication is to be enabled.

In one embodiment, at (2) the choice to enable selective machine checking communication may be written to flag 2432B. The selection of flag 2432B among flags 2432A-2432N to receive the enablement may indicate that software 2404B, out of software 2404A-2404N, is to receive selective machine checking communication.

At (3), an error in shared resource 2408 may be detected. Such an error may require reporting. In one embodiment, the error may include a corrected error wherein a threshold number of corrected errors has been reached. In another embodiment, the error may include an uncorrected error.

At (4), processor package 1802 may send a message or interrupt identifying that an error has occurred to each of logical processors 2402A-2402N. Thus, each of logical processors 2402A-2402N may receive the message.

At (5), logical processor 2402B may evaluate its field 2430B and determine that flag 2432B has been set. Accordingly, in one embodiment logical processor 2402B may propagate a message or interrupt indicating the error condition to software 2404B. In another embodiment, logical processor 2402B may first forward the message or interrupt to software 2404B and evaluate field 2430B and flag 2432B upon a subsequent read from software 2404B. In such an embodiment, logical processor 2402B may respond to the read from software 2404B with information associated with the error, such as information stored in error recording fields 2414.

At (6), other logical processors such as logical processors 2402A, 2402N may evaluate their respective fields 2430A, 2430N and determine that flags 2432A, 2432N have not been set. Accordingly, logical processors 2402A, 2402N may disregard or suppress the message or interrupt to software 2404A, 2404N. Suppression may be accomplished in any suitable manner. In one embodiment, logical processors 2402A, 2402N may first forward the message or interrupt to software 2404A, 2404N. However, upon a subsequent read by software 2404A, 2404N to obtain details about the error, logical processors 2402A, 2402N may report that no error information is available, indicating to software 2404A, 2404N that there is no error. In another embodiment, logical processors 2402A, 2402N may simply not forward the initial message or interrupt to software 2404A, 2404N.

Figure 25:
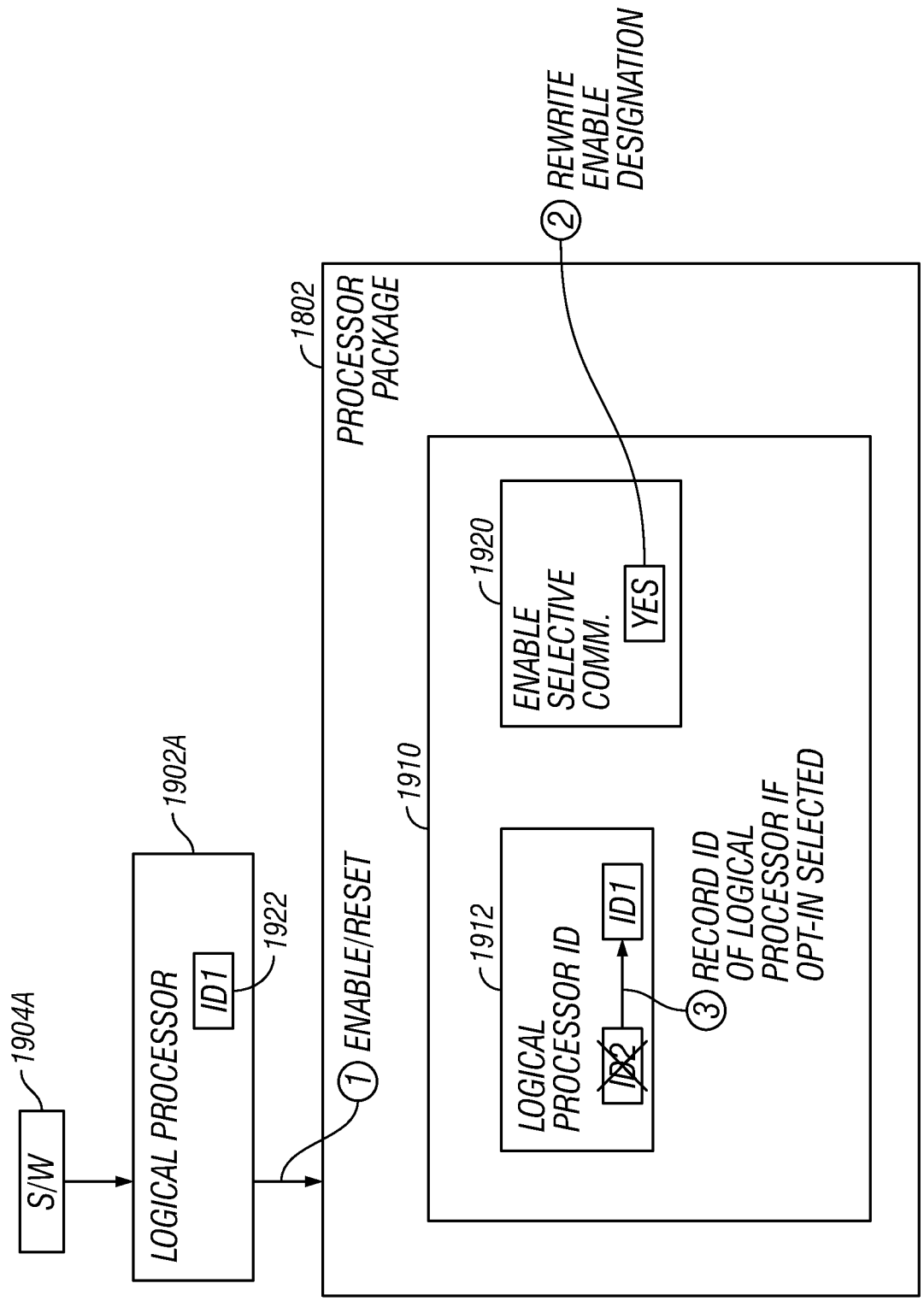
FIG. 25 is an illustration of example operation of a system to change a designated logical processor for receiving selec

FIG. 25 is an illustration of example operation of system 1800 to change a designated logical processor for receiving selective machine checking communication, in accordance with embodiments of the present disclosure. The operation of FIG. 24 may be predicated upon an initialization such as shown in FIG. 20 such that structure 1912 has been populated with an identification 1924 of a given one of logical processors 1902A-1902N. For example, identification 1924 may include "ID2" corresponding to logical processor 1902B such that logical processor 1902B will be the recipient of selective machine checking communication.

At (1), software 1904A may determine that logical processor 1902B should be taken offline or otherwise not used. Thus, software 1904A may issue any suitable enable, rewrite, write, or reset command to reassign the preferred logical processor in processor package 1802 for the given shared resource 1908. For example, software 1904A may issue a write command to structure 1920 to enable selective machine check communication. The write command may be issued even though selective machine check communication is already enabled for a given shared resource 1908.

At (2), processor package 1802 may receive the enable or rewrite command from software 1904A. If the enable or rewrite command is implemented as a write command to structure 1920, processor package 1802 may ensure that structure 1920 is set accordingly. In the example of FIG. 25, the value written to structure 1920 is the same as the value that existed at structure 1920. Thus, processor package 1802 may rewrite the same value to structure 1912 and selective machine check communication may be maintained.

As a consequence of writing to structure 1920, processor package 1802 may record the identity of the responsible logical processor. Thus, at (3) processor package 1802 may record "ID1" to structure 1912. Subsequent selective machine checking communication with respect to shared resource 1908 may directed to logical processor 1902A.

Figure 26:
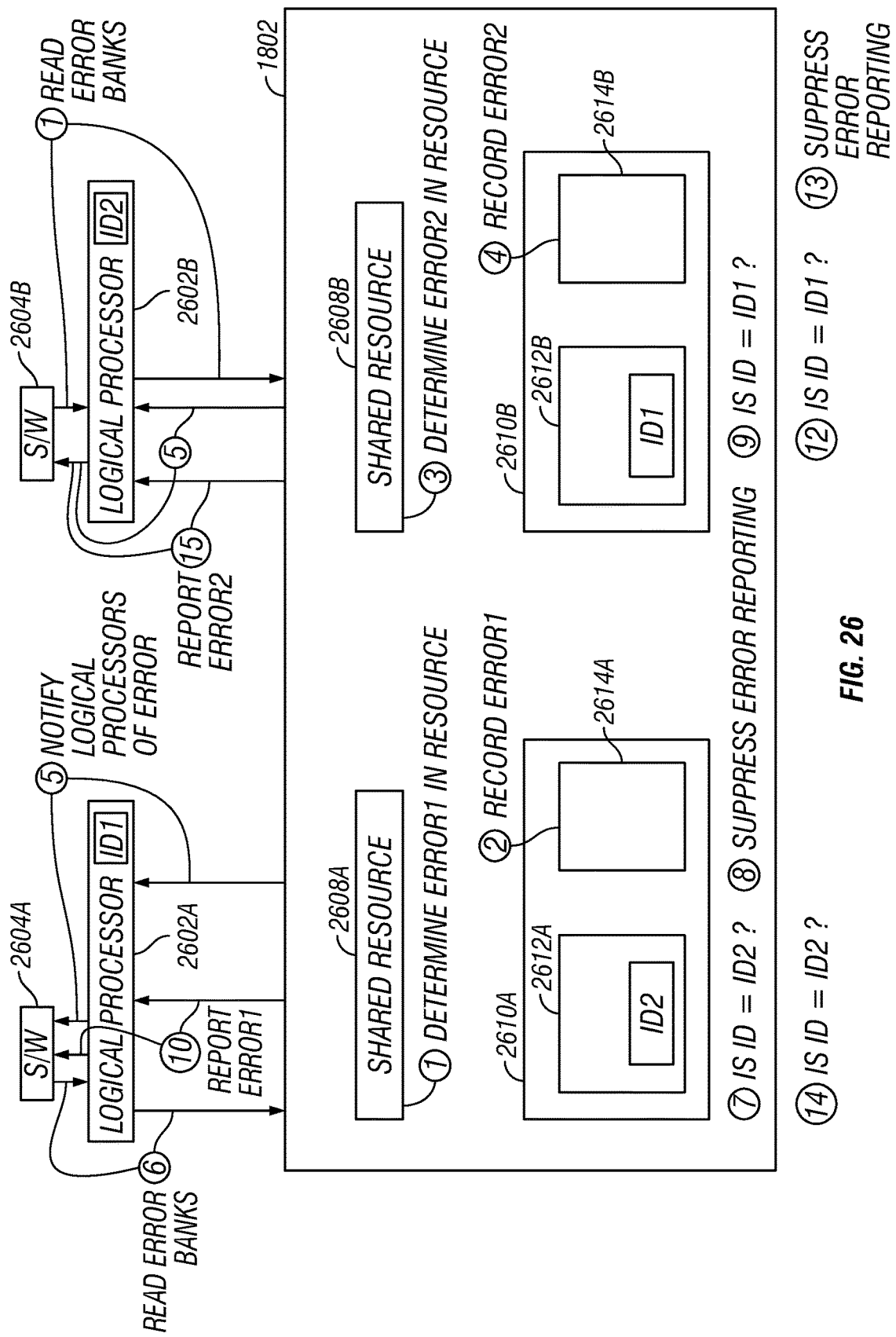
- FIG. 26 is a more detailed illustration of a system for providing machine checking communication information to only affected logical processors, in accordance with embodiments of the present disclosure.

FIG. 26 is a more detailed illustration of system 1800 for providing machine checking communication information to only affected logical processors, in accordance with embodiments of the present disclosure. In one embodiment, system 1800 may provide selective machine checking communication by determining whether a given enquiring logical processor is responsible for handling a determined error.

Processor package 1802 may include shared resources 2608A, 2608B which may implement any one of resources 1812, 1814, 1816, 1818, 1820, 1822, 1824. In one embodiment, each of shared resources 2608A, 2608B may be shared by a plurality of logical processors 2602A, 2602B. Although only two logical processors 2602 are illustrated, shared resources 2608A, 2608B may be shared by any number of logical processors 2602. Furthermore, although only two shared resources 2608A, 2608B are illustrated, logical processors 2604 may share any number of shared resources 2608. Each of logical processors 2602A, 2602B may implement one of logical processors 1808 of FIG. 18. In one embodiment, each of logical processors 2602A, 2602B may execute corresponding software 2604A, 2604B. Each of software 2604A, 2604B may implement one of software 1804 of FIG. 18. Although each of logical processors 2602A, 2602B is illustrated as associated with one of software 2604A, 2604B, in another embodiment a given one of logical processors 2602A, 2602B may be associated with no software at any given time. Such a situation may occur, for example, when the number of threads required in system 1800 is less than the number of available logical processors 2602A, 2602B.

Logical processors 2602A, 2602B may implement a subset of the logical processors 1808 of FIG. 18. In one embodiment, logical processors 2602A, 2602B may share access to one or more resources. In another embodiment, logical processors 2602A, 2602B may illustrate only those logical processors 1808 that are presently sharing access to a particular resource, such as shared resources 2608A, 2608B. The number and identify of logical processors accessing shared resources 2608A, 2608B may change over time. Thus, logical processors 2602A, 2602B may illustrate a subset of the logical processors of processor package 1802. While the access of other resources of processor package 1802 is not illustrated, the access described herein in conjunction with 2602A, 2602B may be replicated for other such resources. Logical processors 2602A, 2602B are shown outside processor package 1802 for the purposes of illustration only. Logical processors 2602A, 2602B are located inside processor package 1802. The handling of access of resources such as shared resources 2608A, 2608B may be conducted through various elements of processor package 2602.

Processor package 1802 may include any suitable number, type, or combination of elements to implement error banks 1826. For example, processor package 1802 may include shared resource error banks 2610A, 2610B. In one embodiment, shared resources 2608A, 2608B may correspond to shared resource error banks 2610A, 2610B, respectively.

Shared resource error banks 2610A, 2610B may be implemented in any suitable manner, such as by a register, file, memory location, cache, or other suitable entity. In one embodiment, processor package 1802 may include a shared resource error bank 2610 for each resource that is shared by multiple logical processors, cores, or processors. In another embodiment, processor package 1802 may include a single shared resource error bank 2610 that in turn includes information for each resource that is shared by multiple logical processors, cores, or processors.

Shared resource error banks 2610A, 2610B may include any suitable number, kind, or combination of bits, fields, flags, indicators, memory locations, data structures, or other suitable entities to store information related to selective machine checking communication. For example, each shared resource error bank 2610 may include a structure 2614 for indicating the nature of one or more errors that have been encountered. Structure 2614 may be implemented in any suitable manner, such as by a flag, bit, register, data structure, or portion or combination thereof. In one embodiment, structure 2614 may be implemented by a range of bits on a MSR. Furthermore, each shared resource error bank 2610 may include a structure 2612 for indicating an identity of a logical processor. In one embodiment, structure 2612 may be implemented by a range of bits on a MSR.

In one embodiment, processor package 1802 may determine to which logical processor 2602 and software 2604 selective machine checking communication should be directed. In a further embodiment, selective machine checking communication may be implemented by sending an interrupt to all logical processors 2602 and software 2604 that an error has occurred, but only providing additional error information to a responsible one of logical processors 2602. Thus, processor package 1802 may determine an identification of a responsible one of logical processors 2602 and, by association, software 2604.

Processor package 1802 may record an identification of a particular logical processor 2602 in structure 2612. In one embodiment, the identification may correspond to a particular logical processor 2602 associated with an error. The generation and detection of the error may yield the identity of the particular logical processor 2602. Any suitable manner or mechanism of identifying a particular logical processor 2602 may be used. In one embodiment a particular logical processor may be defined in absolute, unique terms. In another embodiment, a particular logical processor may be defined in relative terms. In yet another embodiment, a particular logical processor 2602 may be identified by an APIC identifier. In still yet another embodiment, a particular logical processor 2602 may be identified by a logical processor identifier.

Processor package 1802 may populate structure 2614 with any suitable information about errors that have been encountered and that have caused the need for selective machine checking communication. For example, processor package 1802 may populate structure 2614 with error codes, corrected error codes, counts of errors encountered, identifiers of affected components, flags, or any other suitable information. Structure 2614 may be accessed by an instance of software 2604 after receipt of selective machine checking communication. Software 2604 may take any suitable corrective action based upon the information included within structure 2614. After corrective action has been taken, software 2604 may clear structure 2614 fully or in part to indicate to other portions of system 1800 that the error has been handled.

In one embodiment, information entered into structure 2614 may not be included in notifying all logical processors 2602 that an error has occurred. Interrupts, for example, may have insufficient space to communication information included in structure 2614. Accordingly, software 2604 might not receive information in structure 2614 upon receipt of an initial interrupt. Software 2604 might only receive such information from structure 2614 after first receiving a notification that an error has occurred, querying processor package 1802 through a respective logical processor 2602, and then receiving selective machine checking communication.

In one embodiment, processor package 1802 may perform selective machine checking communication by comparing an identification of a querying logical processor 2602 against the identification stored in structure 2612. If the identifications match, processor package 1802 may return error information, such as the information within the respective structure 2614. If the identifications do not match, processor package 1802 may suppress the error information. Such suppression may be accomplished, in one embodiment, by returning data to the querying logical processor 2602 that indicates no error information is available.

By performing selective machine checking communication, processor package 1802 may avoid situations in which a given logical processor 2602 attempts to read errors for which it cannot handle. Such a situation may result in, for example, an unnecessary shutdown. For example, an error arising from a Data Cache Unit (DCU) fault and an error arising from an Instruction Fetch Unit (IFU) fault may be independently recoverable if handled by separate logical processors. If a logical processor encounters a DCU fault and an IFU fault, the software may be unable to distinguish the source of the errors and thus may require shutdown.

In operation, at (1), processor package 1802 may determine that an error (designated error1) has occurred in shared resource 2608A. For example, an IFU fault may have occurred in shared resource 2608A. In one embodiment, processor package 1802 may identify a responsible logical processor from the error. In a further embodiment, processor package 1802 may store an identification of the logical processor in structure 2612A. At (2), processor package 1802 may record information about the error in structure 2614A.

At (3), processor package 1802 may determine that an error has occurred in shared resource 2608B. For example, a DCU fault may have occurred in shared resource 2608B. In one embodiment, processor package 1802 may identify a responsible logical processor from the error. In a further embodiment, processor package 1802 may store an identification of the logical processor in structure 2612B. At (4), processor package 1802 may record information about the error in structure 2614B.

At (5), logical processors 2602A, 2602B sharing access to shared resources 2608A, 2608B may be notified that one or more error conditions exist, and that the error condition may require corrective action. In one embodiment, the notification may be implemented by an interrupt. The notification may be, by itself, insufficient for a logical processor to take corrective action. Thus, in one embodiment logical processors 2602A, 2602B may require obtaining additional information from processor package 1802 in order to actually take corrective action. Each of logical processors 2604A, 2604B may receive such an interrupt, even if a given one of logical processors 2604A, 2604B is not responsible for handling any of the errors.

At (6), software 2604A may issue a command to read information from error banks of processor package 1802. In one embodiment, in response processor package 1802 may determine, for each shared resource 2608A, 2608B whether software 2604A, through its associated logical processor 2602A, should selectively receive machine checking communication regarding a given reported error.

Accordingly, at (7), processor package 1802 may compare the identification of the requesting logical processor 2602A with the identification stored in structure 2612A that indicates the logical processor responsible for handling the first determined error. In one embodiment, if the requesting logical processor matches the responsible logical processor then the error information will be provided. Otherwise, the error information will be suppressed by, for example, providing information indicating that no error handling is required. For example, at (8) processor package 1802 may suppress error reporting of the error of shared resource 2608A to logical processor 2602A, because logical processor 2602B ("ID2") is not the logical processor with respect to the detected error.

At (9), processor package 1802 may compare the identification of the requesting logical processor 2602A with the identification stored in structure 2612A that indicates the logical processor responsible for handling the second determined error. Processor package 1802 may thus determine that the requesting logical processor 2602A matches the identification stored in structure 2612A. At (10), processor package 1802 may return appropriate error information from, for example, structure 2614B.

At (11), software 2604B may issue a command to read information from error banks of processor package 1802. In response, processor package 1802 may determine, for each shared resource 2608A, 2608B whether software 2604B, through its associated logical processor 2602B, should selectively receive machine checking communication regarding a given reported error.

At (12), processor package 1802 may compare the identification of the requesting logical processor 2602B with the identification stored in structure 2612B that indicates the logical processor responsible for handling the second determined error. At (13) processor package 1802 may suppress error reporting of the error of shared resource 2608B to logical processor 2602B, because logical processor 2602A ("ID1") is identified in structure 2612B.

At (14), processor package 1802 may compare the identification of the requesting logical processor 2602B with the identification stored in structure 2612B that indicates the logical processor responsible for handling the second determined error. Processor package 1802 may thus determine that the requesting logical processor 2602B matches the identification stored in structure 2612B. At (15), processor package 1802 may return appropriate error information from, for example, structure 2614B.

Figure 27:
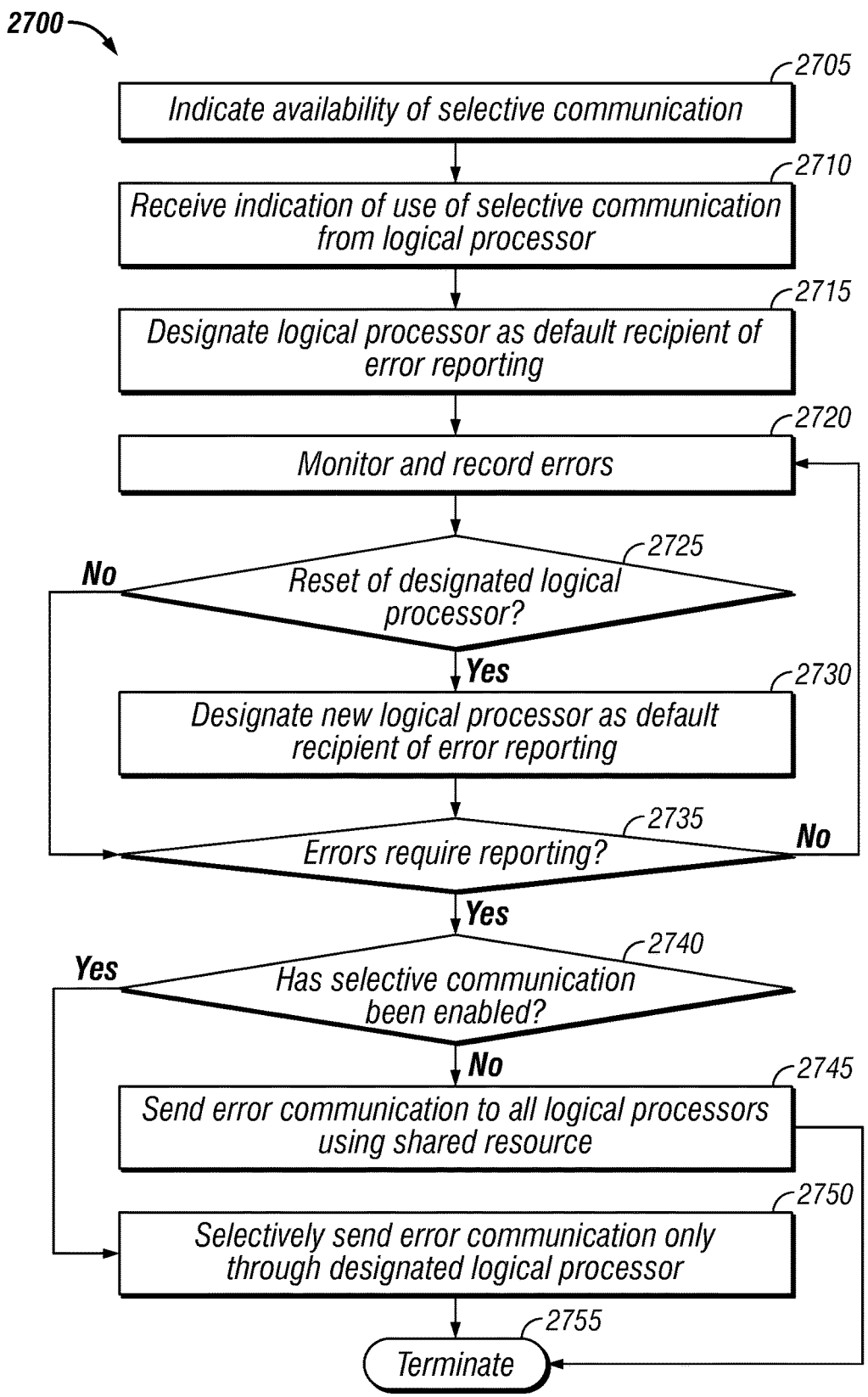
FIG. 27 is an illustration of an example method for selective machine check communication, in accordance with embodiments of the present disclosure.

FIG. 27 is an illustration of an example method 2700 for selective machine check communication, in accordance with embodiments of the present disclosure.

At 2705, the availability of selective communication of machine checking information may be indicated. Such availability may be indicated by, for example, setting a bit or other value in a register. The register may be visible to a logical processors and associated software that may take advantage of selective communication of machine checking information. The selective communication may be provided on a per-shared resource basis, wherein a plurality of logical processors executing the software may share access to the resource and consequently selective communication regarding errors of the resource.

At 2710, indications of use of selective communication may be received from a logical processor. Such indications may enable selective communication for a given shared resource. The indication may be implemented in the form of, for example, a write to an enabling bit on a register visible to the logical processor and associated software. At 2715, an identification of the logical processor may be designated as a default recipient of error reporting during selective communication of machine checking information. The identification may be made, for example, by writing an identifier to a register.

At 2720, errors arising from the shared resource may be monitored, recorded, and tracked. At 2725, it may be determined whether a rewrite of the designated logical processor has been received. Such a rewrite may be received, for example, in the form of another received indication of use of selective communication from a different logical processor. The indication may include a write to the enabling bit on the register by the newly presented logical register. If a rewrite has been received, method 2700 may proceed to 2730. If a rewrite has not been received, method 2700 may proceed to 2735. At 2730, an identification of the newly presented logical processor making the rewrite may be designated as a default recipient of error reporting during selective communication of machine checking information.

At 2735, it may be determined whether errors require reporting. Such a determination may be made, for example, by determining whether any uncorrected errors associated with the shared resource have been encountered, or by determining whether a count of corrected errors associated with the shared resources has been exceeded. If the errors do not require reporting, method 2700 may proceed to 2720. If the errors do require reporting, method 2700 may proceed to 2740.

At 2740, it may be determined whether the selective communication has been enabled by software shared access to the resource. Selective communication may have been enabled or disabled since an initial determination of enablement. Furthermore, in some embodiments, the initial determination of enablement may not have been performed. The determination of whether selective communication has been enabled may be performed by, for example, evaluating a bit or flag in a register that may be set or reset by software choosing whether use selective communication. If selective communication has not been enabled, method 2700 may proceed to 2745. If selective communication has been enabled, method 2700 may proceed to 2750.

At 2745, error communication, such as interrupts or messages, may be sent to all logical processors using a shared resource. The interrupts or messages may be sent to respective software instances associated with the logical processors. The software may then handle the error by taking any suitable corrective action. Method 2700 may then terminate at 2755.

At 2750, error communication, such as an interrupt or message, may be selectively sent through a single logical processor using the shared resource. The single logical processor may be designated as illustrated in 2715 or 2730. The interrupt or message may be sent selectively through a single logical processor by, for example, sending the interrupt or message to all logical processors using the shared resource; however, the interrupt or message may include an indication that all the logical processors except one should drop the interrupt or message such that associated software does not receive error handling information. Furthermore, the interrupt or message may be sent selectively through a single logical processor by sending the interrupt or message to a single logical processor. The interrupt or message may be sent to a respective software instance associated with the logical processors. The software may then handle the error by taking any suitable corrective action. Method 2700 may then terminate at 2755.

Figure 28:
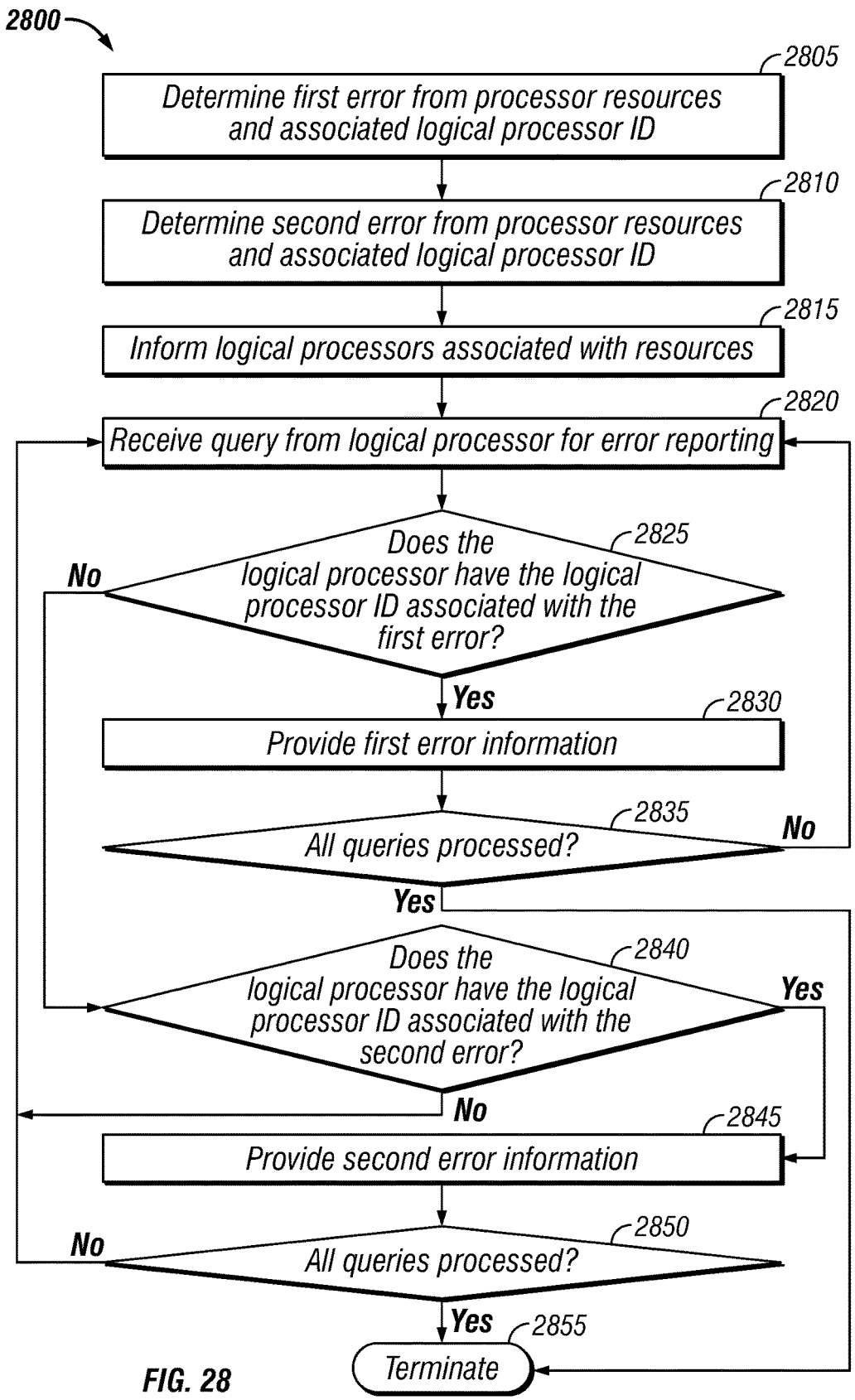
FIG. 28 is an illustration of an example method for selective machine checking communication with respect to compound errors, in accordance with embodiments of the present disclosure.

FIG. 28 is an illustration of an example method 2800 for selective machine checking communication with respect to compound errors, in accordance with embodiments of the present disclosure.

At 2805, a first error from a processor resource may be determined. In addition, an identification of a logical processor associated with the error may be determined. The processor resources may be shared by multiple logical processors. The logical processor may be associated with the error because, for example, the logical processor made the last access of the resource before the error was detected. The error may be recorded in, for example, a register that may be subsequently read by a logical processor attempting to perform corrective action. The first error may include, for example, a DCU fault.

At 2810, a second error from the same or another processor resource may be determined. In addition, an identification of a logical processor associated with the second error may be determined. The second error may be recorded in, for example, a register that may be subsequently read by a logical processor attempting to perform corrective action. The first error may include, for example, an IFU fault. The simultaneous reporting of the first error and the second error to a given logical processor may be unrecoverable.

At 2815, logical processors may be informed about the existence of errors that may require corrective action. The notification may be insufficient for any of the logical processors to actually perform corrective action; such corrective action may require follow-up queries by a logical processor to determine additional information about the error. Logical processors that are not responsible for a given error, or any error, may nonetheless be notified in 2815. For example, all logical processors using a given shared resource may be notified regarding the existence of the errors. In another example, all logical processors for a given core or processor originating the error may be notified regarding the existence of the errors.

At 2820, a query for additional information about the error may be received from a given logical processor. In 2825, it may be determined whether the given logical processor matches the logical processor ID associated with the first error. If not, method 2800 may proceed to 2840. If the logical processor does match the stored logical processor ID, then method 2800 may proceed to 2830.

At 2830, information regarding the first error may be provided to the given logical processor in response to the query. The query and response may include a read of a register and an unadulterated response to the read. At 2835, it may be determined whether all queries have been processed. If so, method 2800 may proceed to 2855 and terminate. If not, method 2800 may proceed to 2820.

At 2840, it may be determined whether the given logical processor matches the logical processor ID associated with the second error. If not, method 2800 may proceed to 2820. If the logical processor does match the stored logical processor ID, then method 2800 may proceed to 2845.

At 2845, information regarding the second error may be provided to the given logical processor in response to the query. The query and response may include a read of a register and an unadulterated response to the read. At 2850, it may be determined whether all queries have been processed. If so, method 2800 may proceed to 2855 and terminate. If not, method 2800 may proceed to 2820.

Methods 2700, 2800 may be initiated by any suitable criteria. Furthermore, although methods 2700, 2800 describes an operation of particular elements, methods 2700, 2800 may be performed by any suitable combination or type of elements. For example, methods 2700, 2800 may be implemented by the elements illustrated in FIGS. 1-27 or any other system operable to implement methods 2700, 2800. As such, the preferred initialization point for methods 2700, 2800 and the order of the elements comprising methods 2700, 2800 may depend on the implementation chosen. In some embodiments, some elements may be optionally omitted, repeated, or combined.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

In some embodiments, a processor may include a logic to determine an error condition reported in an error bank, another logic to generate an interrupt indicating the error condition, and yet another logic to selectively send the interrupt to a single one of logical processors associated with the error bank. The error bank may be communicatively coupled to the processor and associated with logical processors of the processor. The processor may also include logic to store an identification of a source logical processor, the source logical processor writing an indication of the error condition to the error bank. The processor may include yet another logic to set the source logical processor as a default recipient of the interrupt selectively sent to a single one of the logical processors associated with the error bank. The processor may include a logic to indicate, to the logical processors associated with the error bank, an enablement of selectively sending the interrupt. The processor may include a logic to receive, from one of the logical processors associated with the error bank, a notification indicating enablement of selectively sending the interrupt, and selectively sending the interrupt may be based upon the receipt of the notification.

In other embodiments, a processor may include a logic to determine an error condition reported in an error bank, the error bank associated communicatively coupled to the processor and associated with logical processors of the processor. The processor may include a logic to store an identification of an affected logical processor responsible for the error condition. The affected logical processor included in the plurality of logical processors may be associated with the error bank. The processor may include a logic to generate an interrupt indicating that one or more errors have occurred and sending the interrupt to the logical processors of the processor. The processor may include a logic to receive a read request regarding the interrupt from a handler logical processor. The processor may include a logic to determine whether an identification of the handler logical processor matches the identification of the affected logical processor. The processor may include a logic to, based on the determination of the whether the identifications match, determine whether to return the requested data to the handler logical processor. The identification of the first handler logical processor may fail to match the identification of the affected logical processor, and the processor may include a logic to, based on the determination of the failure to match, return an indication of zero errors to the handler logical processor. The identification of the handler logical processor may match the identification of the affected logical processor, and the processor may include a logic to, based on the determination of the match, return information about the error condition sufficient for the handler logical processor to take corrective action with respect to the error condition. The processor may include a logic to determine another error condition reported in an error bank, the other condition arising from another error in the processor. The processor may include a logic to store an identification of another affected logical processor responsible for the other error condition, the other affected logical processor included in the logical processors associated with the error bank. The processor may include a logic to receive a read request regarding the interrupt from another handler logical processor. The processor may include a logic to determine whether an identification of the other handler logical processor matches the identification of the other affected logical processor. The processor may include a logic to, based on the determination of the whether the identifications match, determine whether to return the requested data to the other handler logical processor. The logical processors may be different. A combination of the error conditions may be unrecoverable when handled by the handler logical processor. The combination of the error conditions may be unrecoverable when handled by the other handler logical processor. The logical processors of the processor may include at least one logical processor that fails to match any identifications of affected logical processors.

A method may include, within a processor, determining an error condition reported in an error bank. The error condition may arise from an error in the processor. The error bank may be associated with logical processors of the processor. The method may include generating an interrupt indicating the error condition. The method may include selectively sending the interrupt to a single one of logical processors associated with the error bank. The method may include storing an identification of a source logical processor writing an indication of the error condition to the error bank. The source logical processor may be included in logical processors associated with the error bank. The method may include storing an identification of a source logical processor writing an indication of the error condition to the error bank. The method may include setting the source logical processor as a default recipient of the interrupt selectively sent to a single one of the logical processors associated with the error bank. Furthermore, the method may include indicating, to logical processors associated with the error bank, an enablement of selectively sending the interrupt. The method may include receiving, from one of logical processors associated with the error bank, a notification indicating enablement of selectively sending the interrupt. Selectively sending the interrupt may be based upon the receipt of the notification.

In other embodiments, a method may include, within a processor, determining a error condition reported in an error bank. The error condition may arise from an error in the processor. The error bank may be associated with logical processors of the processor. The method may include storing an identification of an affected logical processor responsible for the error condition. The affected logical processor may be included in logical processors associated with the error bank. The method may include generating an interrupt indicating that one or more errors have occurred and sending the interrupt to logical processors of the processor. The method may include receiving a read request regarding the interrupt from a handler logical processor and determining whether an identification of the handler logical processor matches the identification of the affected logical processor. The method may include, based on the determination of the whether the identifications match, determining whether to return the requested data to the handler logical processor. The identification of the handler logical processor may fail to match the identification of the affected logical processor, and, based on the determination of the failure to match, the method may include returning an indication of zero errors to the handler logical processor. The identification of the handler logical processor may matches the identification of the affected logical processor, and, based on the determination of the match, the method may include returning information about the error condition sufficient for the handler logical processor to take corrective action with respect to the error condition. The method may include determining another error condition reported in an error bank, the other error condition arising from another error in the processor. The method may also include storing an identification of another affected logical processor responsible for the other error condition. The other affected logical processor may be included in logical processors associated with the error bank. The method may include receiving a read request regarding the interrupt from another handler logical processor and determining whether an identification of the other handler logical processor matches the identification of the other affected logical processor. The method may include, based on the determination of the whether the identifications match, determining whether to return the requested data to the other handler logical processor. The logical processors may be different. A combination of the error conditions may be unrecoverable when handled by the handler logical processor. The combination of the error conditions may be unrecoverable when handled by the other handler logical processor. The logical processors of the processor may include at least one logical processor that fails to match any identifications of affected logical processors.

In other embodiments, a system may include a processor and an error bank communicatively coupled to the error bank. The processor may include a logic to determine an error condition reported in the error bank, another logic to generate an interrupt indicating the error condition, and yet another logic to selectively send the interrupt to a single one of logical processors associated with the error bank. The error bank may be communicatively coupled to the processor and associated with logical processors of the processor. The processor may also include logic to store an identification of a source logical processor, the source logical processor writing an indication of the error condition to the error bank. The processor may include yet another logic to set the source logical processor as a default recipient of the interrupt selectively sent to a single one of the logical processors associated with the error bank. The processor may include a logic to indicate, to the logical processors associated with the error bank, an enablement of selectively sending the interrupt. The processor may include a logic to receive, from one of the logical processors associated with the error bank, a notification indicating enablement of selectively sending the interrupt, and selectively sending the interrupt may be based upon the receipt of the notification.

In other embodiments, a system may include a processor and error bank communicatively coupled to the error bank. The processor may include a logic to determine an error condition reported in the error bank. The processor may include a logic to store an identification of an affected logical processor responsible for the error condition. The affected logical processor included in logical processors may be associated with the error bank. The processor may include a logic to generate an interrupt indicating that one or more errors have occurred and sending the interrupt to the logical processors of the processor. The processor may include a logic to receive a read request regarding the interrupt from a handler logical processor. The processor may include a logic to determine whether an identification of the handler logical processor matches the identification of the affected logical processor. The processor may include a logic to, based on the determination of the whether the identifications match, determine whether to return the requested data to the handler logical processor. The identification of the handler logical processor may fail to match the identification of the affected logical processor, and the processor may include a logic to, based on the determination of the failure to match, return an indication of zero errors to the handler logical processor. The identification of the handler logical processor may match the identification of the affected logical processor, and the processor may include a logic to, based on the determination of the match, return information about the error condition sufficient for the handler logical processor to take corrective action with respect to the error condition. The processor may include a logic to determine another error condition reported in an error bank, the other condition arising from another error in the processor. The processor may include a logic to store an identification of another affected logical processor responsible for the other error condition, the other affected logical processor included in the logical processors associated with the error bank. The processor may include a logic to receive a read request regarding the interrupt from another handler logical processor. The processor may include a logic to determine whether an identification of the other handler logical processor matches the identification of the other affected logical processor. The processor may include a logic to, based on the determination of the whether the identifications match, determine whether to return the requested data to the other handler logical processor. The logical processors may be different. A combination of the error conditions may be unrecoverable when handled by the handler logical processor. The combination of the error conditions may be unrecoverable when handled by the other handler logical processor. The logical processors of the processor may include at least one logical processor that fails to match any identifications of affected logical processors.

In other embodiments, a system may include a processor and error bank communicatively coupled to the error bank.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. A apparatus comprising:
   computer memory to store error bank data;
   a processor device connected to the computer memory, wherein the processor device comprises:
      error detection circuitry to:
         determine a first error condition reported in the error bank data, wherein the error bank data is associated with a plurality of logical processors of the processor;
         store, in the error bank data, an identification of a first affected logical processor responsible for the first error condition, wherein the first affected logical processor is included in the plurality of logical processors associated with the error bank data;
      interrupt generation circuitry to generate an interrupt to indicate that one or more errors have occurred based on the first erorr condition, wherein the interrupt is to be sent to the plurality of logical processors of the processor;
      error handling circuitry to:
         receive a read request regarding the interrupt from a first handler logical processor;
         determine whether an identification of the first handler logical processor matches the identification of the first affected logical processor; and
         determine whether to return the requested data to the first handler logical processor based on the determination of whether the identifications match.

2. The apparatus of claim 1, wherein:
   the identification of the first handler logical processor fails to match the identification of the first affected logical processor; and
   the processor further comprises circuitry to return an indication of zero errors to the first handler logical processor based on the determination of the failure to match.

3. The apparatus of claim 1, wherein:
   the identification of the first handler logical processor matches the identification of the first affected logical processor; and
   the processor further comprises circuitry to return information about the first error condition sufficient for the first handler logical processor to take corrective action with respect to the first error condition based on the determination of the match.

4. The apparatus of claim 1, further comprising circuitry wherein the error detection circuitry is further to:
   determine a second error condition reported in the error bank data, the second error condition arising from a second error in the processor;
   store an identification of a second affected logical processor responsible for the second error condition, the second affected logical processor included in the plurality of logical processors associated with the error bank data; and
   wherein the error handling circuitry is further to:
      receive a read request regarding the interrupt from a second handler logical processor;
      determine whether an identification of the second handler logical processor matches the identification of the second affected logical processor; and
      determine whether to return the requested data to the second handler logical processor based on the determination of the whether the identifications match;
   wherein:
      the first handler logical processor and the second handler logical processor are different;
      a combination of the first error condition and the second error condition is unrecoverable when handled by the first handler logical processor; and
      the combination of the first error condition and the second error condition is unrecoverable when handled by the second handler logical processor.

5. The apparatus of claim 1, wherein the plurality of logical processors of the processor includes at least one logical processor that fails to match any identifications of affected logical processors.

6. A method comprising, within a processor:
   determining a first error condition reported in error bank data, the first error condition arising from a first error in the processor, the error bank data associated with a plurality of logical processors of the processor;
   storing an identification of a first affected logical processor responsible for the first error condition, the first affected logical processor included in the plurality of logical processors associated with the error bank data;
   generating an interrupt indicating that one or more errors have occurred and sending the interrupt to the plurality of logical processors of the processor;
   receiving a read request regarding the interrupt from a first handler logical processor;
   determining whether an identification of the first handler logical processor matches the identification of the first affected logical processor; and
   based on the determination of the whether the identifications match, determining whether to return the requested data to the first handler logical processor.

7. The method of claim 6, wherein:
   the identification of the first handler logical processor fails to match the identification of the first affected logical processor; and
   based on the determination of the failure to match, returning an indication of zero errors to the first handler logical processor.

8. The method of claim 6, wherein:
   the identification of the first handler logical processor matches the identification of the first affected logical processor; and based on the determination of the match, returning information about the first error condition sufficient for the first handler logical processor to take corrective action with respect to the first error condition.

9. The method of claim 6, wherein the method further comprises:
   determining a second error condition reported in the error bank data, the second error condition arising from a second error in the processor;
   storing an identification of a second affected logical processor responsible for the second error condition, the second affected logical processor included in the plurality of logical processors associated with the error bank data;
   receiving a read request regarding the interrupt from a second handler logical processor;
   determining whether an identification of the second handler logical processor matches the identification of the second affected logical processor; and
   based on the determination of the whether the identifications match, determining whether to return the requested data to the second handler logical processor;
   wherein:
      the first handler logical processor and the second handler logical processor are different;
      a combination of the first error condition and the second error condition is unrecoverable when handled by the first handler logical processor; and
      the combination of the first error condition and the second error condition is unrecoverable when handled by the second handler logical processor.

10. The method of claim 6, wherein the plurality of logical processors of the processor includes at least one logical processor that fails to match any identifications of affected logical processors.

11. A system comprising:
   computer memory to store error bank data;
   a processor communicatively coupled to the system, comprising:
      a plurality of logical processors associated with the error bank data; and
      circuitry to:
         determine a first error condition reported in the error bank data;
         store an identification of a first affected logical processor responsible for the first error condition, the first affected logical processor included in the plurality of logical processors associated with the error bank data;
         generate an interrupt indicating that one or more errors have occurred and sending the interrupt to the plurality of logical processors of the processor;
         receive a read request regarding the interrupt from a first handler logical processor;
         determine whether an identification of the first handler logical processor matches the identification of the first affected logical processor; and
         determine whether to return the requested data to the first handler logical processor based on the determination of the whether the identifications match.

12. The system of claim 11, wherein:
   the identification of the first handler logical processor fails to match the identification of the first affected logical processor; and
   the processor further comprises circuitry to return an indication of zero errors to the first handler logical processor based on the determination of the failure to match.

13. The system of claim 11, wherein:
   the identification of the first handler logical processor matches the identification of the first affected logical processor; and
   the processor further comprises circuitry to return information, based on the determination of the match, about the first error condition sufficient for the first handler logical processor to take corrective action with respect to the first error condition.

14. The system of claim 11, wherein the processor further comprises circuitry to:
   determine a second error condition reported in the error bank data, the second error condition arising from a second error in the processor;
   store an identification of a second affected logical processor responsible for the second error condition, the second affected logical processor included in the plurality of logical processors associated with the error bank data;
   receive a read request regarding the interrupt from a second handler logical processor;
   determine whether an identification of the second handler logical processor matches the identification of the second affected logical processor; and
   determine whether to return the requested data to the second handler logical processor based on the determination of the whether the identifications match;
   wherein:
      the first handler logical processor and the second handler logical processor are different;
      a combination of the first error condition and the second error condition is unrecoverable when handled by the first handler logical processor; and
      the combination of the first error condition and the second error condition is unrecoverable when handled by the second handler logical processor.

15. The system of claim 11, wherein the plurality of logical processors of the processor includes at least one logical processor that fails to match any identifications of affected logical processors.

* * * * *